United States Patent
Hatano

(10) Patent No.: US 12,362,642 B2
(45) Date of Patent: Jul. 15, 2025

(54) ACTUATOR

(71) Applicant: NIDEC INSTRUMENTS CORPORATION, Nagano (JP)

(72) Inventor: Shinji Hatano, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 238 days.

(21) Appl. No.: 18/319,487

(22) Filed: May 18, 2023

(65) Prior Publication Data

US 2023/0387770 A1 Nov. 30, 2023

(30) Foreign Application Priority Data

May 27, 2022 (JP) .................................. 2022-086490

(51) Int. Cl.
*H02K 33/16* (2006.01)
*H02K 1/34* (2006.01)

(52) U.S. Cl.
CPC .............. *H02K 33/16* (2013.01); *H02K 1/34* (2013.01)

(58) Field of Classification Search
CPC ................................ H02K 1/34; H02K 33/16
USPC ............................................... 310/15, 24, 25
See application file for complete search history.

(56) References Cited

U.S. PATENT DOCUMENTS

| | | | |
|---|---|---|---|
| 10,951,104 B2 | 3/2021 | Takeda et al. | |
| 11,329,540 B2 * | 5/2022 | Tsuchihashi | H02K 33/16 |
| 12,243,684 B2 * | 3/2025 | Mori | H01F 7/126 |
| 2019/0305630 A1* | 10/2019 | Mori | H01F 27/2823 |
| 2020/0161955 A1 | 5/2020 | Kitahara et al. | |
| 2021/0149491 A1* | 5/2021 | Takahashi | G06F 3/044 |
| 2022/0247292 A1* | 8/2022 | Takahashi | H02K 33/02 |
| 2022/0352801 A1* | 11/2022 | Kitahara | H02K 33/16 |
| 2022/0352802 A1* | 11/2022 | Hatano | H02K 33/16 |
| 2023/0011290 A1* | 1/2023 | Hatano | H01F 7/122 |
| 2023/0140711 A1* | 5/2023 | Tsuchihashi | H02K 33/16 310/15 |
| 2023/0198366 A1* | 6/2023 | Tsuchihashi | H02K 33/18 310/28 |
| 2023/0387770 A1* | 11/2023 | Hatano | H02K 1/34 |
| 2023/0387771 A1* | 11/2023 | Hatano | H02K 1/34 |
| 2023/0387772 A1* | 11/2023 | Hatano | H02K 33/16 |
| 2024/0006108 A1* | 1/2024 | Mori | B06B 1/04 |
| 2024/0048035 A1* | 2/2024 | Tsuchihashi | B06B 1/045 |

(Continued)

FOREIGN PATENT DOCUMENTS

JP 2020102901 7/2020

*Primary Examiner* — Rashad H Johnson
(74) *Attorney, Agent, or Firm* — JCIPRNET

(57) ABSTRACT

This actuator includes a movable body provided with a magnet and a yoke, and a support body provided with a case and a coil, and vibrates the movable body. The yoke includes a first opposing portion and a second opposing portion that oppose the coil from both sides in a Z direction. A pair of second joining plate portions that extend from both ends of the second opposing portion are fitted inside a pair of first joining plate portions that extend from both ends of the first opposing portion. In the yoke, both sides of a pair of first connecting bodies that connect the first opposing portion and a first plate that covers the coil from a Z1 direction, and both sides of a pair of second connecting bodies that connect the second opposing portion and a second plate that covers the coil from a Z2 direction, are notched.

10 Claims, 12 Drawing Sheets

(56) References Cited

U.S. PATENT DOCUMENTS

2024/0072629 A1* 2/2024 Hatano ................ H02K 33/16
2024/0429803 A1* 12/2024 Gomi ..................... G06F 3/016

* cited by examiner (a)

(b)

ACTUATOR

CROSS REFERENCE TO RELATED APPLICATION

The present invention claims priority under 35 U.S.C. § 119 to Japanese Application No. 2022-086490 filed May 27, 2022, the entire content of which is incorporated herein by reference.

BACKGROUND

Field of the Invention

At least an embodiment of the present invention relates to an actuator that vibrates a movable body.

Description of the Related Documents

Japanese Patent Application Laid-Open No. 2020-102901 (JPA 2020-102901) discloses an actuator which is provided with a movable body including magnets, and a support body including a coil, and vibrates the movable body with respect to the support body by applying a drive current to the coil. This type of actuator uses an elastic body or a viscoelastic body as a connecting body which connects the support body and the movable body. When the movable body is vibrated, a reaction force corresponding to the vibration of the movable body is applied to the support body through the connecting body. As a result, a user who is touching the support body can feel the vibrations.

In the actuator of JP2020-102901, the support body includes a metal case that defines the outer shape of the actuator, and a coil holder made of resin. The coil is an air core coil and is disposed in a coil placement hole in the coil holder. A metallic plate is attached to the coil holder to cover, from both sides, the coil and a plate portion provided with the coil placement hole. The movable body includes a first yoke that opposes the coil from one side in a first direction, and a second yoke that opposes the coil from an other side in the first direction, and magnets are fixed to each of the first yoke and the second yoke. The first yoke includes a pair of connecting portions that bend and extend toward the second yoke from both ends in a second direction (the direction in which the movable body vibrates) that intersects the first direction. The connecting portions of the first yoke are joined to both ends of the second yoke in the second direction by welding or the like. The connecting body is disposed at both ends of the movable body in a longitudinal direction (a third direction that intersects the first direction and the second direction) in locations where the yoke and the plate covering the coil and oppose each other.

When an actuator is used as a tactile device that causes a user who is touching the support body to sense vibrations, the acceleration of the vibrations of the movable body should be increased in order for the user to sense strong vibrations. For example, it has been proposed to increase the acceleration of the vibrations of a movable body by increasing the weight of the movable body.

For example, in the yoke of JP2020-102901, it has been proposed to increase the weight of the yoke by providing, at both end parts of the movable body in the longitudinal direction (third direction) in which the connecting body is disposed, a bent plate portion that bends toward the second yoke side from both ends of the first yoke in the second direction, and a bent plate portion that bends toward the first yoke side from both ends of the second yoke in the second direction.

However, if the movable body becomes larger due to such a change in the shape of the yoke, the outer shape of the actuator may become larger than a required size. Further, if the weight of the movable body is increased without changing the outer shape of the actuator, and a space is ensured for the movable body to vibrate, it may become difficult to ensure a space for the connecting body to be placed. For example, when bent plate portions are provided as described above on both sides of the connecting body in the second direction (the direction in which the movable body vibrates), the space for the connecting body to be placed in the second direction becomes small.

If the width of the connecting body in the direction in which the movable body vibrates (the second direction in JP2020-102901) is small, the movable body may swing like a pendulum instead of moving forward when it vibrates, and vibration of the movable body may not be stable and result in collisions with the support body. If the gap between the movable body and the fixed bodies is made larger in order to avoid such collisions, the thrust force of the magnetic drive circuit is reduced, and it is not possible to generate large vibrations.

At least an embodiment of the present invention achieves both suppression of an increase in the size of an actuator and ensuring the weight of a movable body, while also suppressing a pendulum motion of the movable body by ensuring a space for a connecting body to be placed.

SUMMARY

An actuator to which at least an embodiment of the present invention is applied includes: a movable body; a support body provided with a case that accommodates the movable body, and a coil holder; a connecting body that is connected to the movable body and the support body; and a magnetic drive circuit provided with a coil that is held by the coil holder, and magnet that opposes the coil in a first direction, and causes the movable body to vibrate with respect to the support body in a second direction that intersects the first direction; wherein the support body is provided with a metallic first plate that overlaps the coil from one side in the first direction, a metallic second plate that overlaps the coil from an other side in the first direction, the movable body includes a yoke that holds the magnet, the yoke has a first yoke provided with a first opposing portion that opposes the first plate from the one side in the first direction, and a pair of first joining plate portions that extend toward the other side in the first direction from both ends of the first opposing portion in the second direction, and a second yoke provided with a second opposing portion that opposes the second plate from the other side in the first direction, and a pair of second joining plate portions that extend toward the one side in the first direction from both ends of the second opposing portion in the second direction, one of the pair of first joining plate portions and the pair of second joining plate portions is disposed inside the other of the pair of first joining plate portions and the pair of second joining plate portions, the connecting body is provided with a pair of first connecting bodies that connect each of a pair of first connecting body fixing portions provided on both ends of the first opposing portion in the third direction and the first plate, the third direction being a direction intersecting the first direction and intersecting the second direction, and in the yoke, both sides of the first connecting bodies in the second direction are notched.

According to at least an embodiment of the present invention, the connecting body (first connecting bodies) is disposed inside the yoke (in positions where the first plate and the first connecting body fixing portions are opposed), and in the yoke, both sides of the first connecting bodies in the second direction are notched. In this way, the width in the second direction of the space in which the first connecting bodies can be placed can be made larger without increasing the size of the outer shape of the movable body. As a result, the length of the first connecting bodies in the second direction can be made longer. Furthermore, in the yoke, because the parts disposed on both sides of the coil in the second direction are configured by stacking the first joining plate portions and the second joining plate portions, the weight of the movable body can be ensured even when both sides of the first connecting bodies in the second direction are notched. Therefore, it is possible to both avoid an increase in the size of the actuator and ensure the weight of the movable body, and the length of the first connecting bodies in the second direction can be ensured. As a result, it is possible to prevent the movable body from swinging like a pendulum (pendulum motion) instead of moving forward when it vibrates.

In at least an embodiment of the present invention, the connecting body is provided with a pair of second connecting bodies that connect each of a pair of second connecting body fixing portions provided on both sides of the second opposing portion in the third direction and the second plate, and in the yoke, both sides of the second connecting bodies in the second direction are notched. In this way, like the first connecting bodies, the length of the second connecting bodies in the second direction can be ensured without increasing the size of the outer shape of the movable body. Therefore, it is possible to both avoid an increase in size of the actuator and ensure the weight of the movable body. In addition, the effect of suppressing the pendulum motion when the movable body vibrates can be enhanced.

In at least an embodiment of the present invention, the coil holder comprises a first holder member provided with a first coil holding portion disposed on one side of the coil in the third direction, and a first holder side plate portion that extends in the first direction from an end of the first coil holding portion on one side in the third direction, and a second holder member provided with a second coil holding portion disposed on an other side of the coil in the third direction, and a second holder side plate portion that extends in the first direction from an end of the second coil holding portion on an other side in the third direction, a width of the first coil holding portion and the second coil holding portion in the second direction is larger than a width of the coil in the second direction, and the pair of first connecting bodies and the pair of second connecting bodies overlap the first coil holding portion and the second coil holding portion from one side in the first direction. In this way, by dividing the coil holder into two members by dividing it in the third direction, a resin part that covers both sides of the coil in the second direction becomes unnecessary. Therefore, the size of the external dimensions of the actuator in the second direction can be reduced. Alternatively, the coil can be made larger without increasing the size of the outer shape of the actuator, and the thrust of the magnetic drive circuit can be increased to generate large vibrations. Furthermore, the dimensions of the first coil holding portion and the second coil holding portion in the second direction is large. Therefore, a space to attach the connecting body having a long dimension in the second direction can be ensured.

In at least an embodiment of the present invention, the yoke is provided with a pair of connection portions that extend in the first direction on both sides of the coil in the second direction, and connect the first opposing portion and the second opposing portion, each of the pair of connection portions is configured by stacking the first joining plate portions and the second joining plate portions, the first coil holding portion, when viewed from the second direction, is disposed in a first notch portion in which an edge of each of the pair of connection portions on one side in the third direction has been notched, and the second coil holding portion, when viewed from the second direction, is disposed in a second notch portion in which an edge of each of the pair of connection portions on an other side in the third direction has been notched. In this way, even when the width of the first coil holding portion and the second coil holding portion in the second direction is made larger, interference of the first coil holding portion and the second coil holding portion with the yoke can be avoided. Therefore, the width in the second direction of the space in which the first connecting bodies and the second connecting bodies can be placed can be made larger without increasing the size of the outer shape of the movable body.

In at least an embodiment of the present invention, the first holder member is provided with a pair of first holder projection portions that protrude toward the other side in the third direction from edges on both sides of the first holder side plate portion in the second direction, the second holder member is provided with a pair of second holder projection portions that protrude toward the other side in the third direction from edges on both sides of the second holder side plate portion in the second direction, and one of the pair of first connecting body fixing portions is disposed between the pair of first holder projection portions, and the other of the pair of first connecting body fixing portions is disposed between the pair of second holder projection portions. In this way, the first holder projection portions and the second holder projection portions function as stoppers that regulate the movable range of the movable body in the second direction. Therefore, it is possible to provide stoppers on the coil holder instead of the case. As a result, it is possible to reduce the possibility that the movable body will collide with the case and be deformed or destroyed due to an impact caused by falling or the like. Therefore, the impact resistance of the actuator can be enhanced.

In at least an embodiment of the present invention, the case is provided with a first case member having a first end plate portion that opposes the movable body from the one side in the first direction, and a pair of first case side plate portions extending toward the other side in the first direction from edges on both sides of the first end plate portion in the second direction, and the first holder projection portions and the second holder projection portions are press-fitted between the pair of first case side plate portions. In this way, rattling of the coil holder with respect to the case can be suppressed by utilizing the parts that function as stoppers. In addition, the coil holder can be fixed to the case without using an adhesive. Therefore, it is possible to improve the ease of assembly.

In at least an embodiment of the present invention, the first plate and the second plate are each provided with a central plate portion that is disposed between the pair of connection portions and overlaps the coil, a one side plate portion that extends toward the one side in the third direction from the central plate portion and overlaps the first coil holding portion, and an other side plate portion that extends toward the other side in the third direction from the central plate portion and overlaps the second coil holding portion, both ends of the central plate portion in the second direction are provided with a central bent portion that is bent in the first direction and covers a side surface of the coil in the second direction, a width of the one side plate portion and the other side plate portion in the second direction is larger than a width of the central plate portion in the second direction, one of the pair of first connecting bodies is connected to the one side plate portion of the first plate, and the other of the pair of first connecting bodies is connected to the other side plate portion of the first plate. In this way, it is possible to ensure a space at both ends of the first plate and the second plate in the third direction to attach the first connecting bodies and the second connecting bodies, which have a long dimension in the second direction. Furthermore, because the coil can be protected by the first plate and the second plate, the possibility that the coil will be damaged due to collision with the magnet or collision with the yoke is low.

In at least an embodiment of the present invention, a length of the first connecting bodies in the second direction is larger than a width of the central plate portion in the second direction. In this way, by making the length of the first connecting bodies long in the second direction, the effect of suppressing the pendulum motion when the movable body vibrates can be enhanced.

In at least an embodiment of the present invention, both ends of the one side plate portion of the first plate in the second direction and both ends of the other side plate portion of the first plate in the second direction are each provided with a fixing bent portion, which are bent toward the other side in the first direction, and are locked to end surfaces on both sides of the first coil holding portion and the second coil holding portion in the second direction. In this way, the coil assembly can be assembled by locking and positioning the first plate with respect to the first holder member and the second holder member. Therefore, even when the coil holder is divided into two members, a reduction in the ease of assembling the actuator can be suppressed.

In at least an embodiment of the present invention, the first yoke is provided with a plate-shaped first inner member that overlaps the coil from the one side in the first direction, and a first outer member that overlaps the first inner member from the one side in the first direction, and the second yoke is provided with a plate-shaped second inner member that overlaps the coil from the other side in the first direction, and a second outer member that overlaps the second inner member from the other side in the first direction. In this way, because the thickness of the parts opposing the coil in the first direction is increased as a result of stacking two members, the weight of the yoke can be increased. Furthermore, because the weight of the yoke can be increased by using members having the plate thickness of a general-purpose product, an increase in cost of the components can be avoided.

According to at least an embodiment of the present invention, the connecting body (first connecting bodies) is disposed inside the yoke (in positions where the first plate and the first connecting body fixing portions are opposed), and in the yoke, both sides of the first connecting bodies in the second direction are notched. In this way, the width in the second direction of the space in which the first connecting bodies can be placed can be made larger without increasing the size of the outer shape of the movable body. As a result, the length of the first connecting bodies in the second direction can be made longer. Furthermore, in the yoke, because the parts disposed on both sides of the coil in the second direction are configured by stacking the first joining plate portions and the second joining plate portions, the weight of the movable body can be ensured even when both sides of the first connecting bodies in the second direction are notched. Therefore, it is possible to both avoid an increase in the size of the actuator and ensure the weight of the movable body, and the length of the first connecting bodies in the second direction can be ensured. As a result, it is possible to prevent the movable body from swinging like a pendulum (pendulum motion) instead of moving forward when it vibrates.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

(a) and (b) of FIG. 1 are perspective views of an actuator to which at least an embodiment of the present invention is applied when viewed from a Z2 direction and a Z1 direction.

DETAILED DESCRIPTION

An embodiment of an actuator to which at least an embodiment of the present invention is applied will now be described with reference to the drawings.

Figure 1:
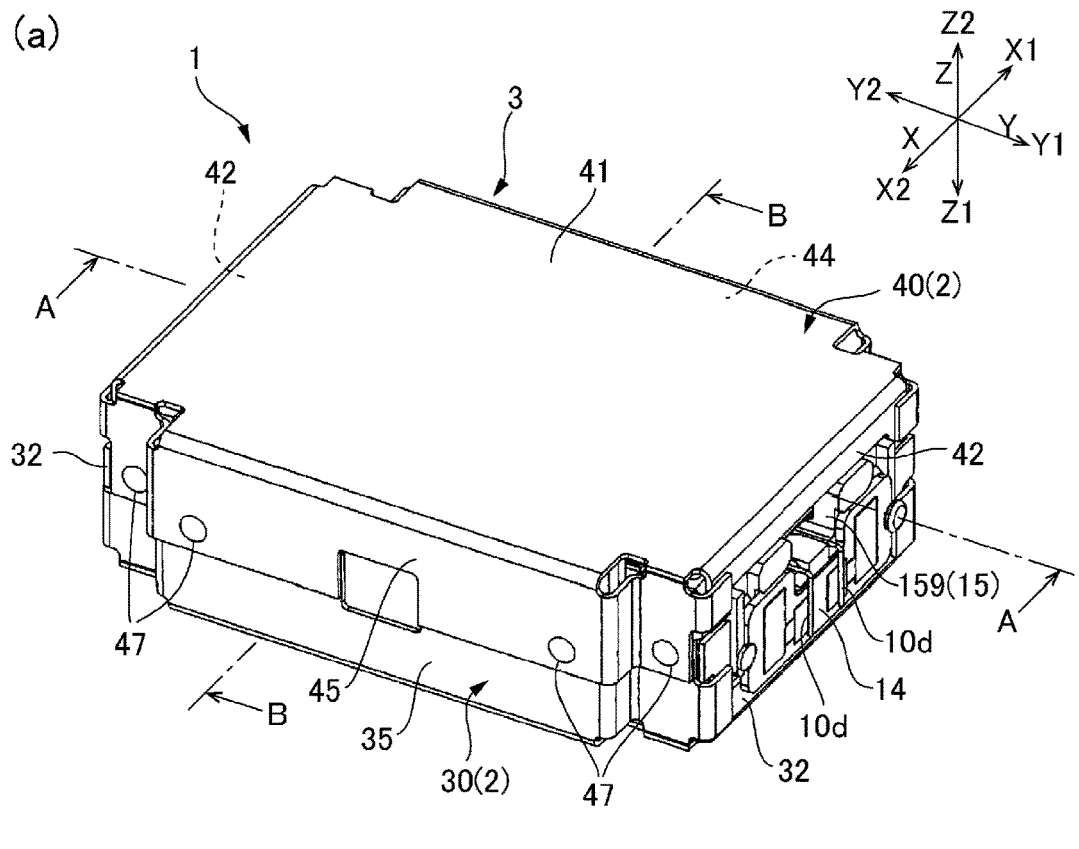
Figure 1:
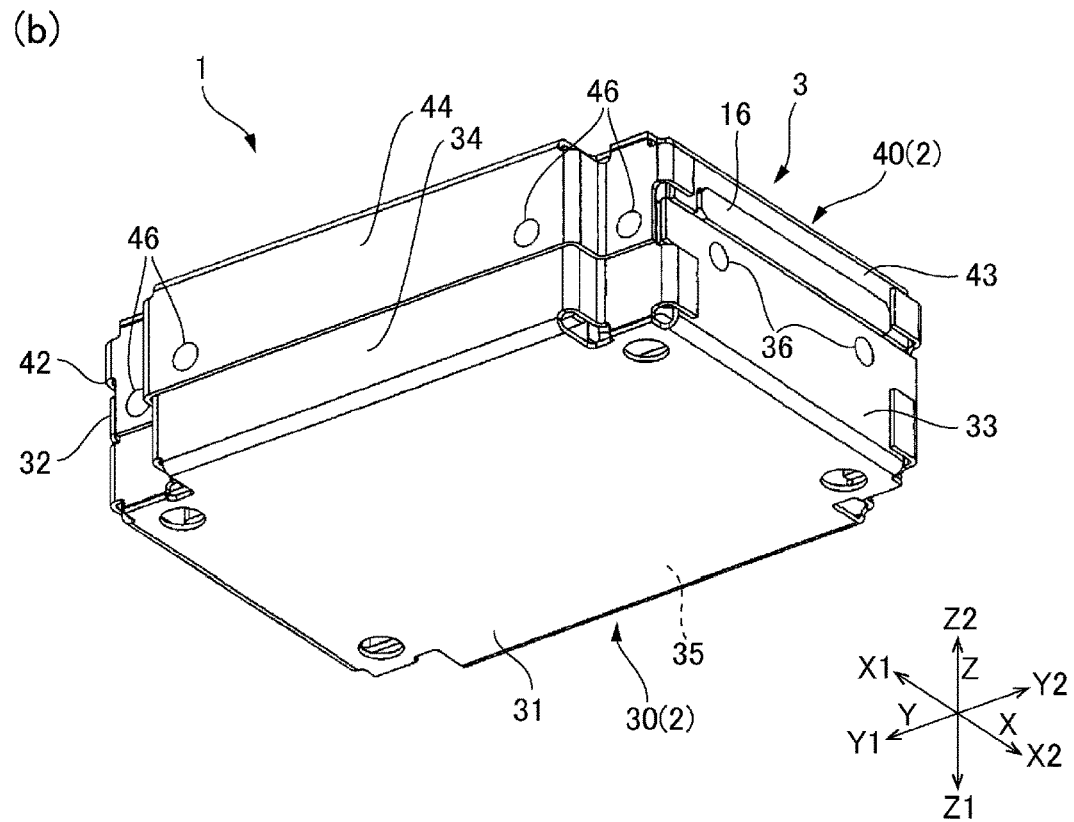

Overall Configuration (a) of FIG. 1 is a perspective view of an actuator 1 to which at least an embodiment of the present invention is applied when viewed from a Z2 direction.

Figure 2:
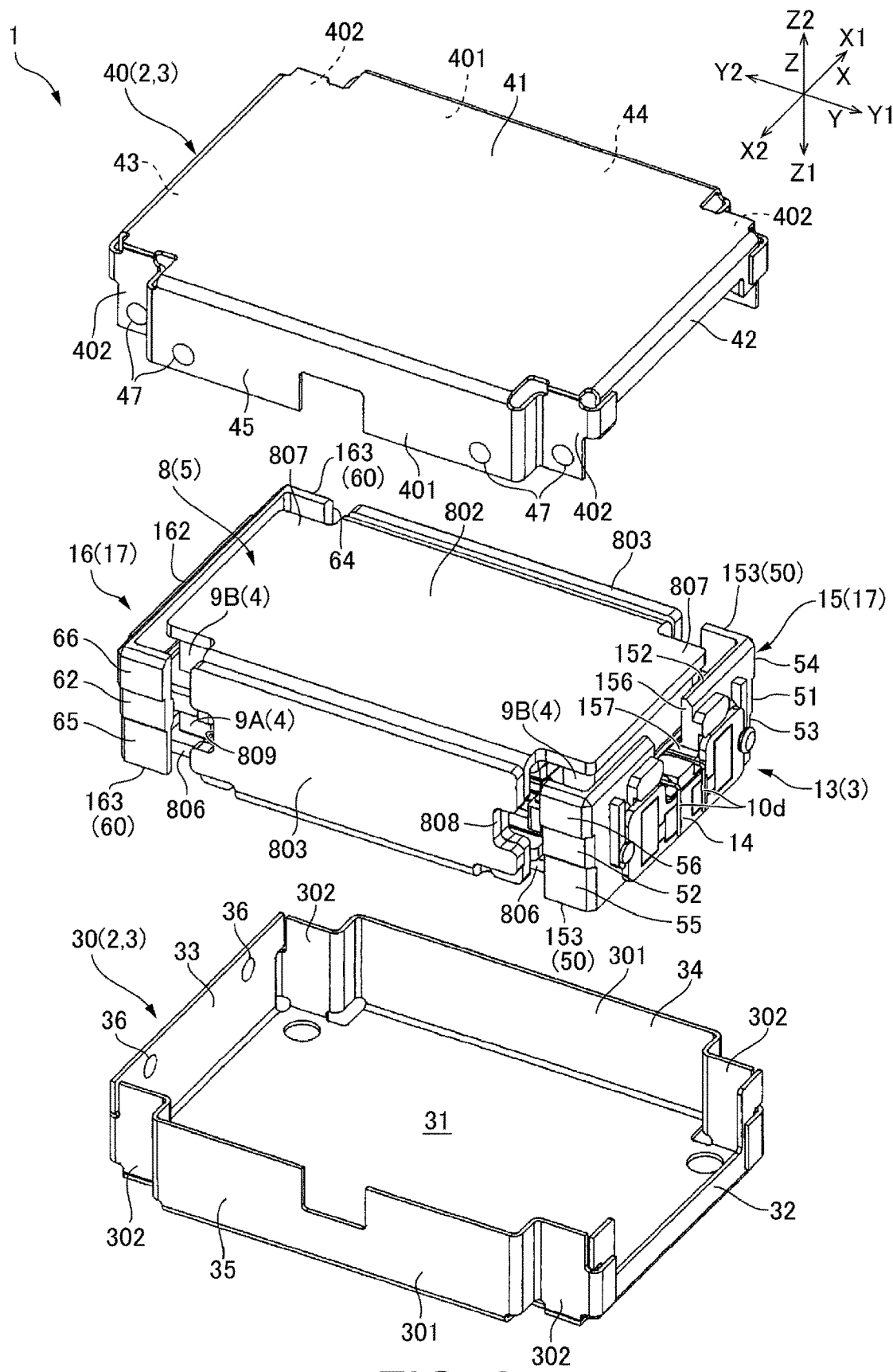
FIG. 2 is an exploded perspective view of an actuator showing a support body disassembled into a coil assembly, a first case member, and a second case member.
Figure 3:
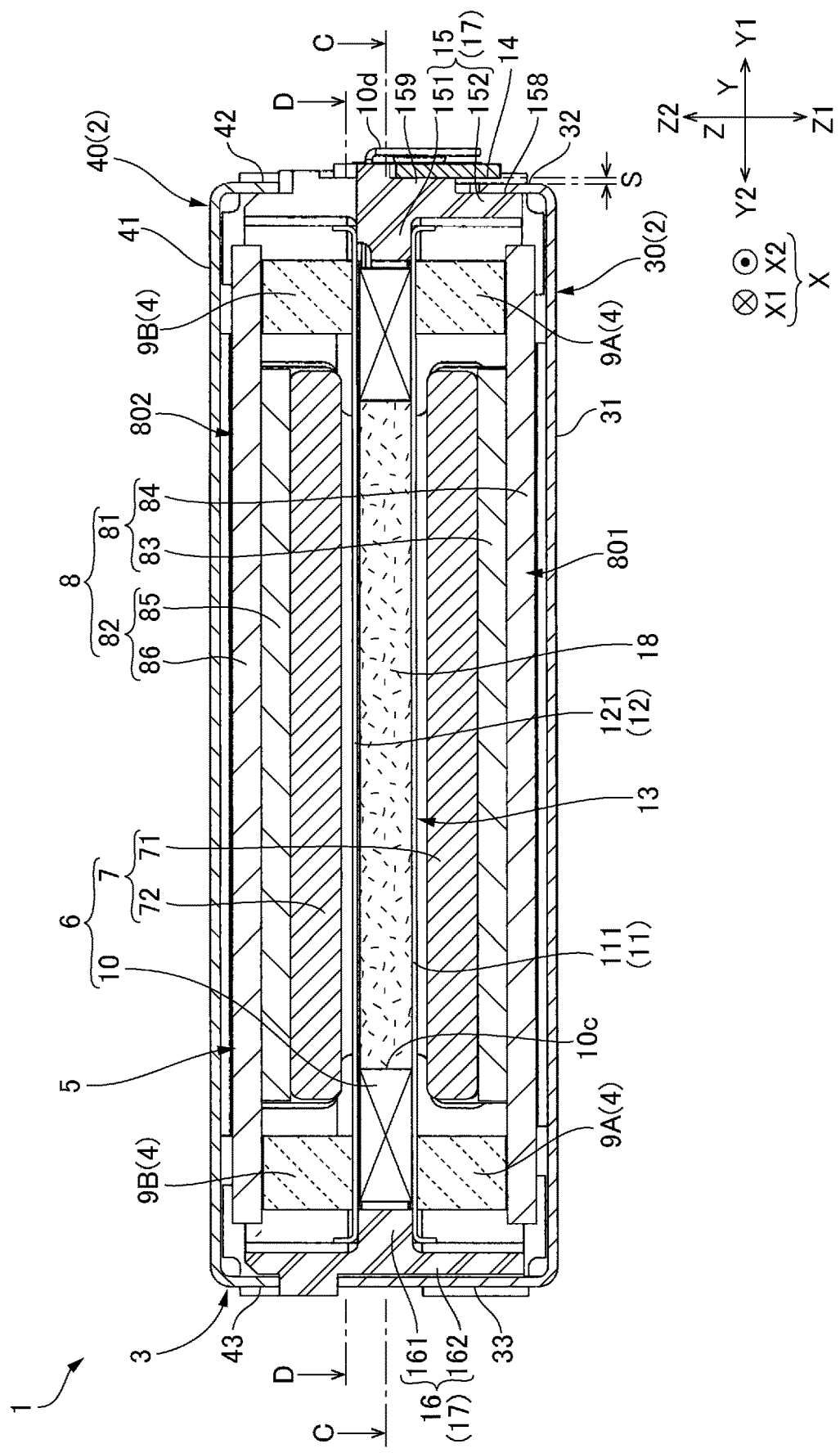
FIG. 3 is a cross-sectional view of an actuator taken in the YZ plane (a cross-sectional view taken along position A-A in (a) of FIG. 1).
Figure 4:
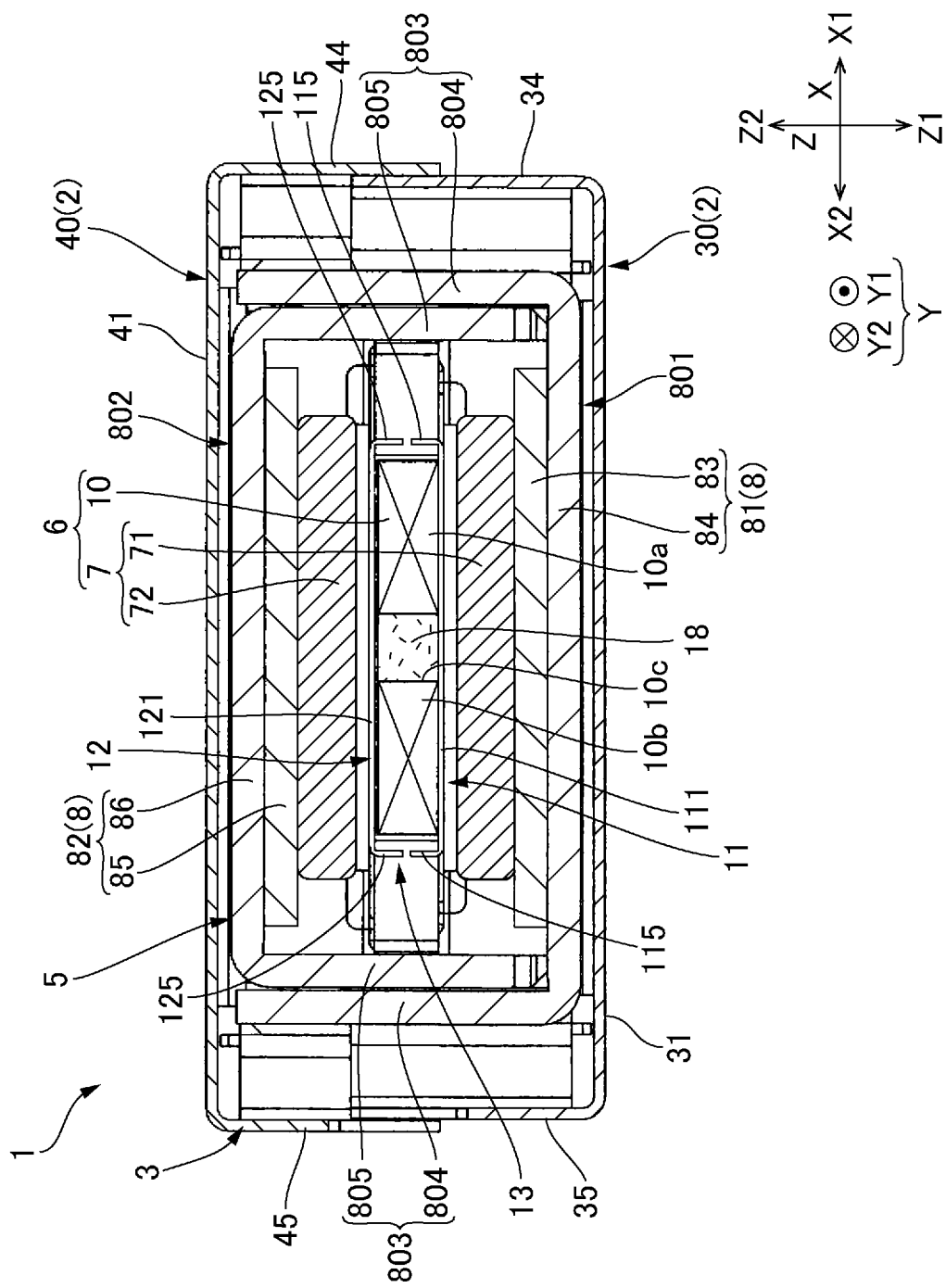
FIG. 4 is a cross-sectional view of an actuator taken in the XZ plane (a cross-sectional view taken along position B-B in (a) of FIG. 1).
Figure 5:
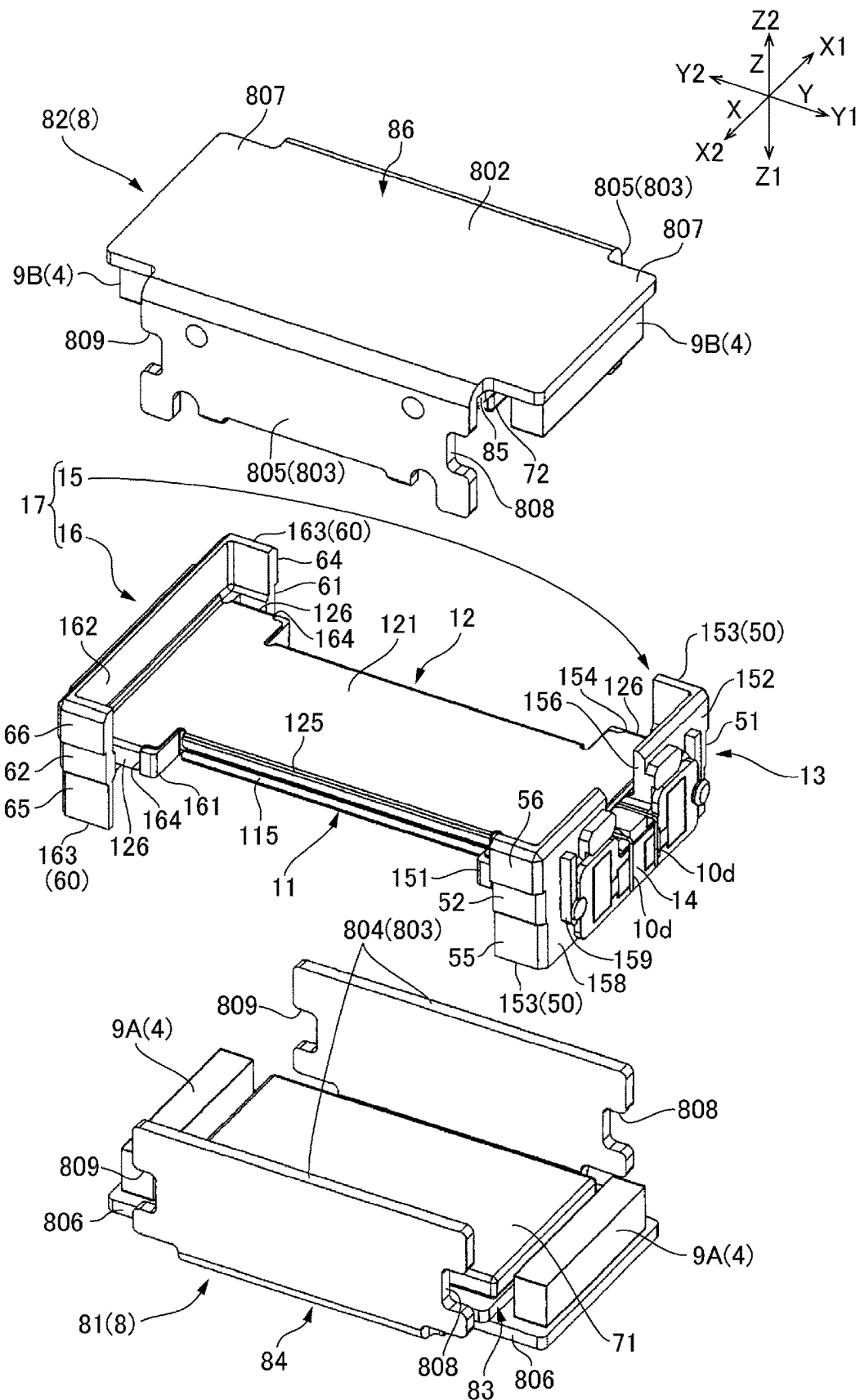
FIG. 5 is an exploded perspective view of a movable body and a coil assembly when viewed from a Z2 direction.
Figure 6:
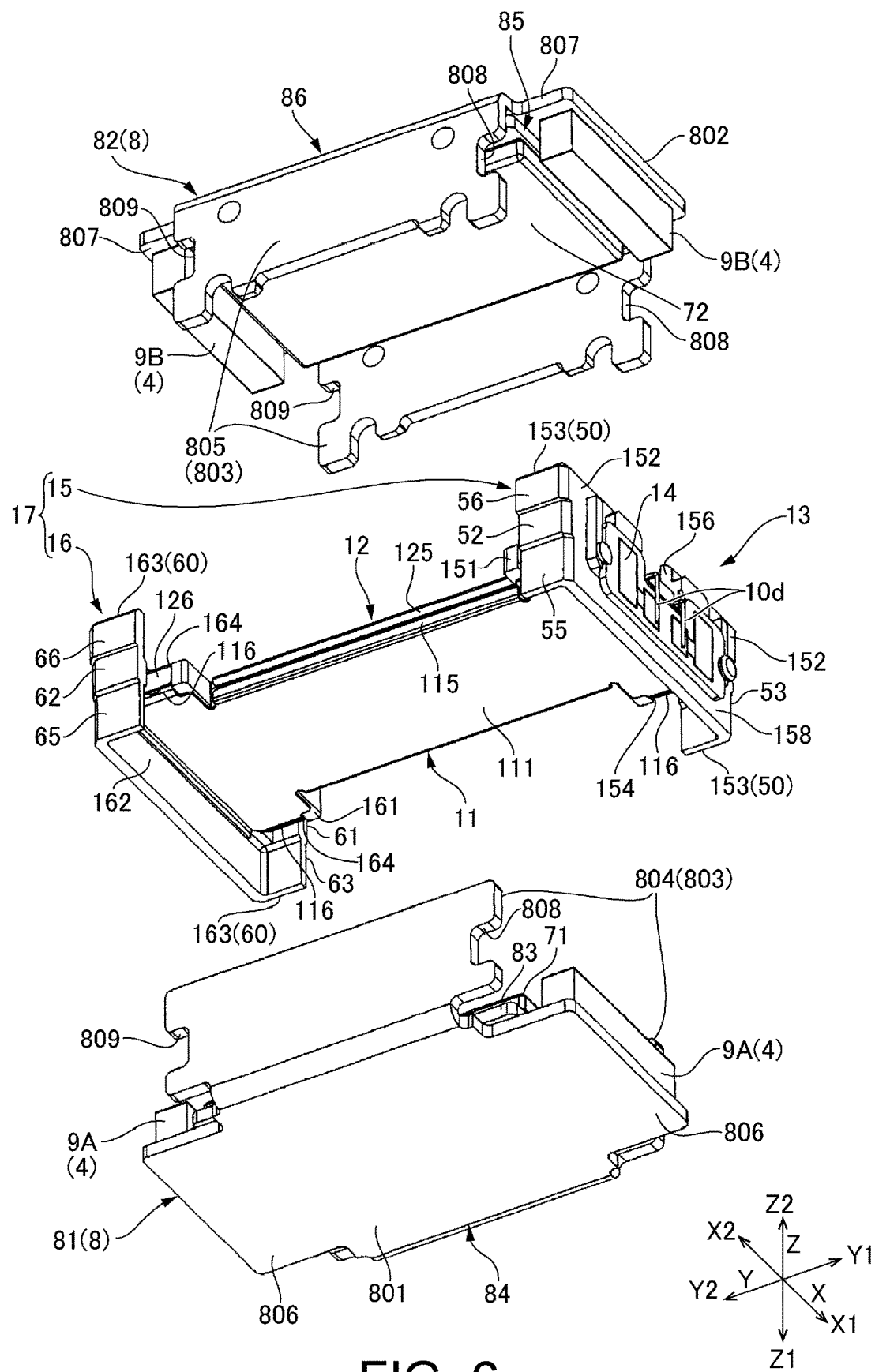
FIG. 6 is an exploded perspective view of a movable body and a coil assembly when viewed from a Z1 direction.
Figure 7:
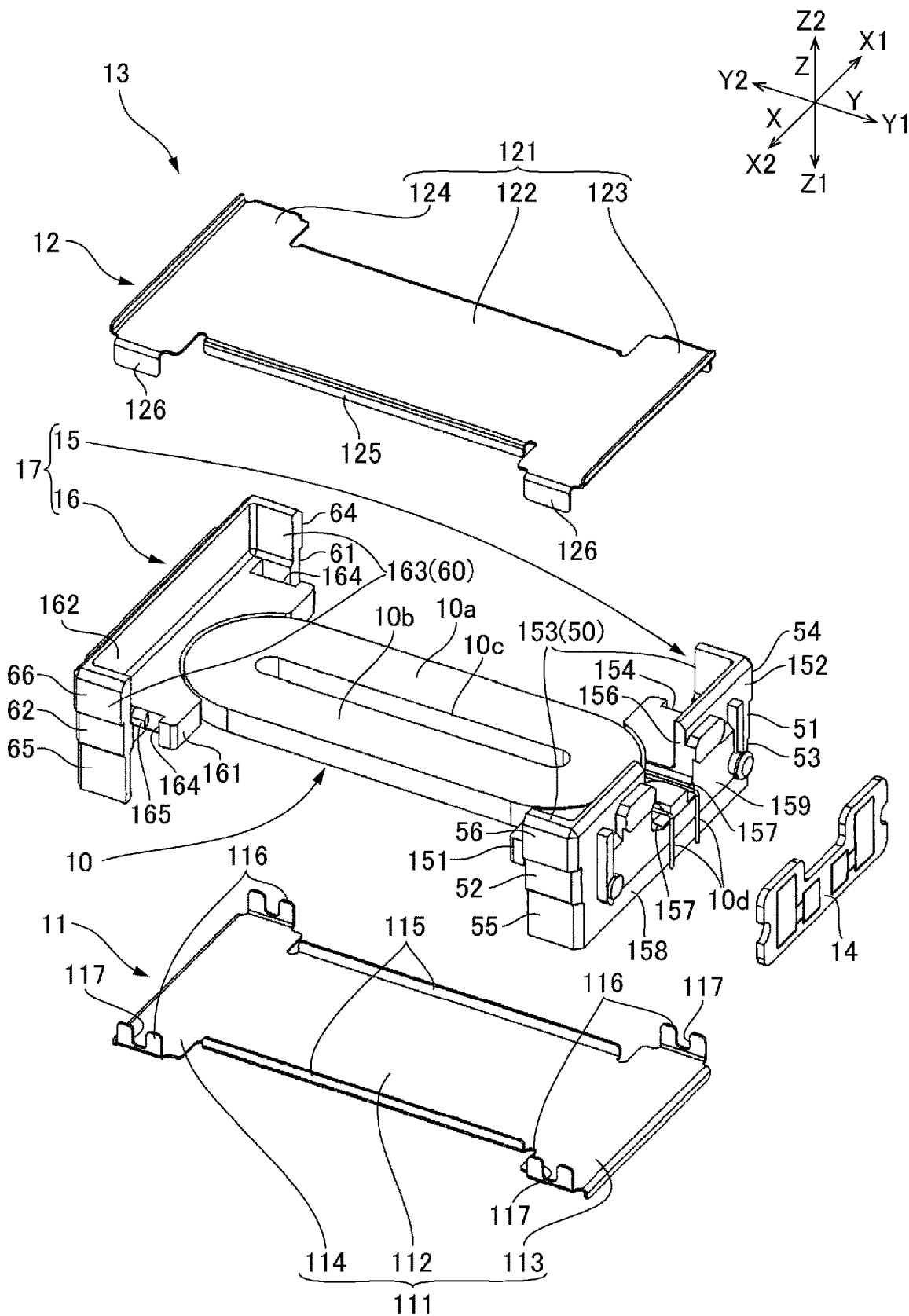
FIG. 7 is an exploded perspective view of a coil assembly.
Figure 8:
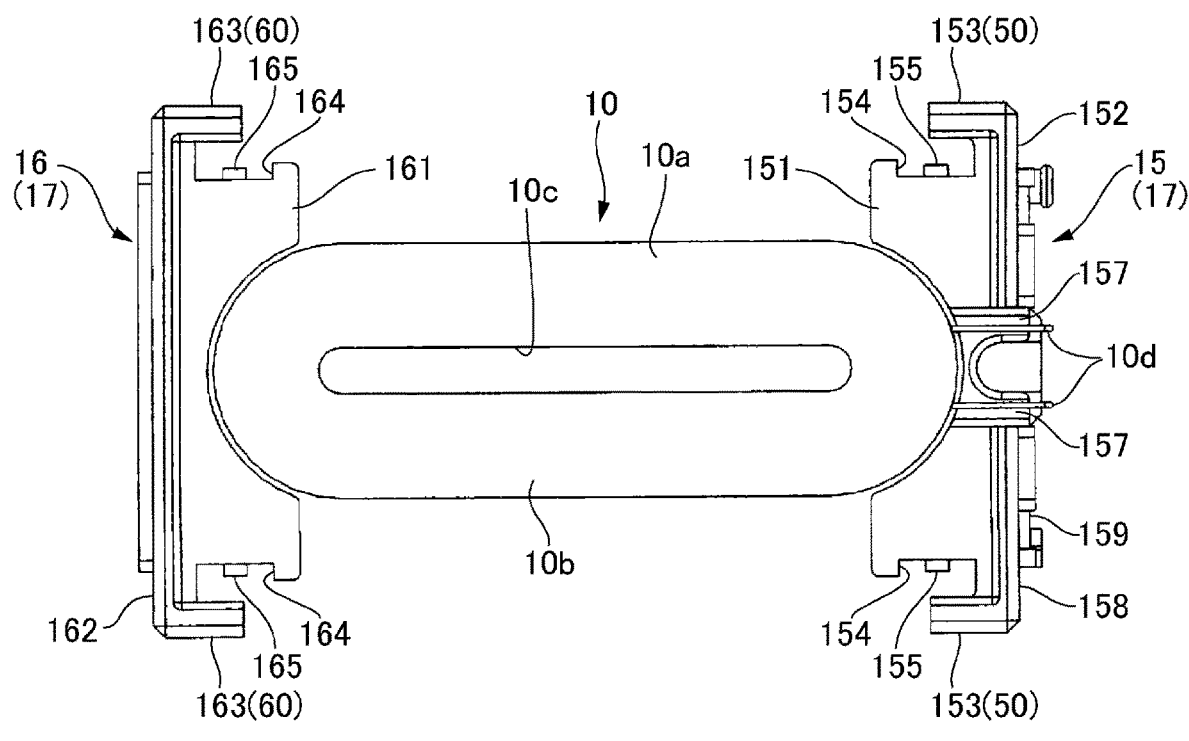
FIG. 8 is a plan view of a coil holder and a coil.
Figure 9:
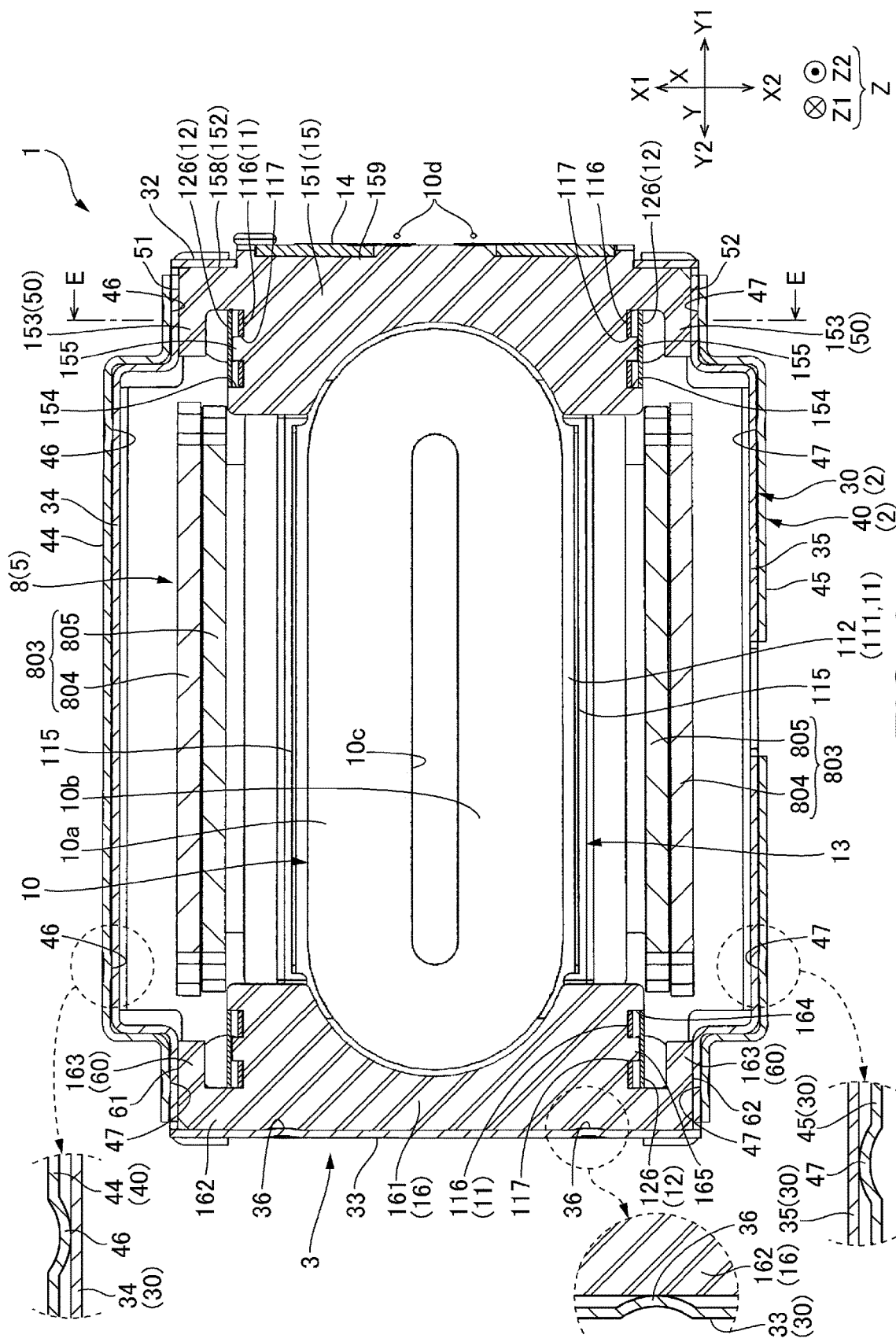
FIG. 9 is a cross-sectional view of an actuator taken in the XY plane (a cross-sectional view taken along position C-C in FIG. 3) and partially enlarged views thereof.

(b) of FIG. 1 is a perspective view of the actuator 1 to which at least an embodiment of the present invention is applied when viewed from a Z1 direction. FIG. 2 is an exploded perspective view of the actuator 1, showing a support body 3 disassembled into a coil assembly 13, a first case member 30, and a second case member 40. FIG. 3 is a cross-sectional view of the actuator 1 taken in the YZ plane, and is a cross-sectional view taken along position A-A in (a) of FIG. 1. FIG. 4 is a cross-sectional view of the actuator 1 taken in the XZ plane, and is a cross-sectional view taken along position B-B in (a) of FIG. 1. FIG. 5 is an exploded perspective view of a movable body 5 and the coil assembly 13 when viewed from a Z2 direction. FIG. 6 is an exploded perspective view of a movable body 5 and the coil assembly 13 when viewed from a Z1 direction. FIG. 7 is an exploded perspective view of the coil assembly 13. FIG. 8 is a plan view of a coil holder 17 and a coil 10. FIG. 9 is a cross-sectional view and partially enlarged views of the actuator 1 taken in the XY plane, and is a cross-sectional view taken along position C-C in FIG. 3.

The actuator 1 is used as a tactile device that transmits information by vibrations. As illustrated in (a) and (b) of FIG. 1, the outer shape of the actuator 1 is substantially in the form of a rectangular parallelepiped. The actuator 1 generates vibrations in a transverse direction of the outer shape. In the description below, the transverse direction in which vibrations are generated will be referred to as the X direction (second direction). The longitudinal direction of the actuator 1, which is orthogonal to the X direction, will be referred to as the Y direction (third direction). The thickness direction (height direction) of the actuator 1, which is orthogonal to the X direction and the Y direction, will be referred to as the Z direction (first direction). Furthermore, the one side in the X direction will be referred to as the X1 direction, and the other side will be referred to as the X2 direction. The one side in the Y direction will be referred to as the Y1 direction, and the other side will be referred to as the Y2 direction. The one side in the Z direction will be referred to as the Z1 direction, and the other side will be referred to as the Z2 direction.

As shown in (a) and (b) of FIG. 1 to FIG. 4, the actuator 1 includes a support body 3 provided with a case 2 that defines the outer shape of the actuator 1, and a movable body 5 which is accommodated inside the case 2. Furthermore, the actuator 1 is provided with a connecting body 4 which connects the support body 3 and the movable body 5, and a magnetic drive circuit 6 which relatively moves the movable body 5 with respect to the support body 3 in the X direction (see FIGS. 3 and 4). As shown in FIG. 3, the connecting body 4 includes first connecting bodies 9A and second connecting bodies 9B.

As shown in (a) and (b) of FIG. 1 and FIG. 2, the support body 3 is provided with a case 2 and a coil assembly 13. As shown in FIGS. 3 and 4, the coil assembly 13 includes a coil 10 disposed in the center of the actuator 1 in the Z direction. The case 2 is provided with a first case member 30 and a second case member 40 that are stacked in the Z direction. The first case member is mounted on the coil assembly 13 from the Z1 direction. The second case member 40 is mounted on the coil assembly 13 and the first case member 30 from the Z2 direction.

As shown in FIGS. 3 and 4, the movable body 5 includes a magnet 7 and a yoke 8. As shown in FIG. 4, the magnet 7 is fixed to an inner surface of the yoke 8, which is configured so as to surround the coil 10. The coil 10 and the magnet 7, which are opposed in the Z direction, constitute the magnetic drive circuit 6. The movable body 5 includes, as the magnet 7, a first magnet 71 and a second magnet 72. The first magnet 71 and the second magnet 72 are polarized into two poles in the X direction. When the movable body 5 and the support body 3 are assembled, the coil 10 opposes the first magnet 71 in the Z1 direction, and opposes the second magnet 72 in the Z2 direction.

Coil Assembly

As shown in FIG. 7, the coil assembly 13 is provided with the coil 10, a first plate 11 stacked in the Z1 direction of the coil 10, and a second plate 12 stacked in the Z2 direction of the coil 10. The first plate 11 and the second plate 12 are made from a non-magnetic metal. Furthermore, the coil assembly 13 is provided with a first holder member 15 disposed on the Y1 side of the coil 10, and a second holder member 16 disposed on the Y2 side of the coil 10. The first holder member and the second holder member 16 constitute a coil holder 17. The first holder member 15 and the second holder member 16 are made from resin.

As shown in FIGS. 2 and 3, the coil 10 is positioned at the center of the case 2 in the Z direction. The coil 10 is a flat air core coil, and the thickness direction thereof is oriented in the Z direction. As shown in FIG. 7, the coil 10 has an oval shape that is long in the Y direction, and includes a pair of long side portions 10a and 10b that extend parallel to each other in the Y direction. A central hole 10c extending in the Y direction is provided between the pair of long side portions 10a and 10b. The long side portions 10a and 10b of the coil 10 oppose the first magnet 71 and the second magnet 72 in the Z direction.

As shown in FIGS. 7 and 8, the first holder member 15 includes a first coil holding portion 151 disposed between the first plate 11 and the second plate 12, a first holder side plate portion 152 that extends from the end of the first coil holding portion 151 on the Y1 side toward the Z1 direction and the Z2 direction, and a pair of first holder projection portions 153 that protrude in the Y2 direction from both ends of the first holder side plate portion 152 in the X direction. The first coil holding portion 151 is provided with recess portions 154 formed on both side surfaces in the X direction, and claw portions 155 that protrude from the center of the recess portions 154 in the Y direction. The pair of first holder projection portions 153 each extend to a position opposing the claw portions 155 in the X direction.

A power feed substrate 14 is fixed to the first holder member 15. In the present embodiment, the power feed substrate 14 is a rigid substrate. However, the power feed substrate 14 may be a flexible printed circuit board. Power is supplied to the coil 10 via the power feed substrate 14. Two coil wires 10d that have been drawn out from the coil 10 are disposed in groove portions 157 formed in the first coil holding portion 151, drawn out to the Y1 side of the first holder side plate portion 152 from a notch portion 156, in which a central part of the first holder side plate portion 152 in the X direction is notched toward the Z1 direction, and then bent toward the Z1 side and connected to the power feed substrate 14.

As shown in FIG. 7, the power feed substrate 14 is fixed to a substrate fixing portion 159 that protrudes from a contact surface 158, which is a side surface of the first holder side plate portion 152 in the Y1 direction. The substrate fixing portion 159 surrounds the notch portion 156, through which the coil wires 10d are drawn out, on both sides in the X direction and on the Z1 side. As shown in FIG. 3, the end portion of the power feed substrate 14 on the Z1 side extends to a position further on the Z1 side than the end portion of the substrate fixing portion 159 on the Z1 side.

As shown in FIGS. 7 and 8, the second holder member 16 includes a second coil holding portion 161 disposed between the first plate 11 and the second plate 12, a second holder side plate portion 162 that extends from the end of the second coil holding portion 161 on the Y1 side toward the Z1 direction and the Z2 direction, and a pair of second holder projection portions 163 that protrude in the Y1 direction from both ends of the second holder side plate portion 162 in the X direction. The second coil holding portion 161 is provided with recess portions 164 formed on both side surfaces in the X direction, and claw portions 165 that protrude from the center of the recess portions 164 in the Y direction. The pair of second holder projection portions 163 each extend to a position opposing the claw portions 165 in the X direction.

The coil 10 is disposed between the first coil holding portion 151 and the second coil holding portion 161. As shown in FIG. 7, the first plate 11 includes a plate-shaped first plate portion 111 that overlaps the coil 10 from the Z1 side. The first plate portion 111 includes a central plate portion 112 that overlaps the long side portions 10a and 10b of the coil 10, a one side plate portion 113 that extends in the Y1 direction from the central plate portion 112 and overlaps the first coil holding portion 151, and an other side plate portion 114 that extends in the Y2 direction from the central plate portion 112 and overlaps the second coil holding portion 161. The width of the one side plate portion 113 and the other side plate portion 114 in the X direction is larger than the width of the central plate portion 112 in the X direction.

A pair of central bent portions 115 that are bent in the Z2 direction are provided on both ends of the central plate portion 112 in the X direction. A pair of fixing bent portions 116 that are bent in the Z2 direction are provided on both ends of the one side plate portion 113 in the X direction and both ends of the other side plate portion 114 in the X direction. The fixing bent portions 116 in the four locations are each provided with a rectangular notch portion 117 that is notched toward the Z1 direction.

The second plate 12 includes a flat second plate portion 121 that overlaps the coil 10 from the Z2 side. The second plate portion 121 includes a central plate portion 122 that overlaps the long side portions 10a and 10b of the coil 10, a one side plate portion 123 that extends in the Y1 direction from the central plate portion 122 and overlaps the first coil holding portion 151, and an other side plate portion 124 that extends in the Y2 direction from the central plate portion 122 and overlaps the second coil holding portion 161. The width of the one side plate portion 123 and the other side plate portion 124 in the X direction is larger than the width of the central plate portion 122 in the X direction.

A pair of central bent portions 125 that are bent in the Z1 direction are provided on both ends of the central plate portion 122 in the X direction. As shown in FIGS. 5 and 6, the leading edges of the central bent portions 125 oppose the leading edges of the central bent portions 115 of the first plate 11 in the Z direction. The central bent portions 115 of the first plate 11 and the central bent portions 125 of the second plate 12 cover the side surfaces of the long side portions 10a and of the coil 10 in the X direction. A pair of fixing bent portions 126 that are bent in the Z1 direction are provided on both ends of the one side plate portion 123 in the X direction and both ends of the other side plate portion 124 in the X direction of the second plate 12.

When the coil assembly 13 is assembled, the fixing bent portions 116 in two locations on the Y1 side of the first plate 11 are fitted to the recess portions 154 of the first coil holding portion 151, and the claw portions 155 are fitted to the notch portion 117 of each fixing bent portion 116 (see FIG. 9). As a result, the fixing bent portions 116 in two locations are locked to the side surfaces on both sides of the first coil holding portion 151 in the X direction.

Similarly, the fixing bent portions 116 in two locations on the Y2 side are fitted to the recess portions 164 of the second coil holding portion 161, and the claw portions 165 are fitted to the notch portion 117 of each fixing bent portion 116 (see FIG. 9). As a result, the fixing bent portions 116 in two locations are locked to the side surfaces on both sides of the second coil holding portion 161 in the X direction. As a result, the first holder member 15 and the second holder member 16 are positioned with respect to the first plate 11.

Next, the coil 10 is disposed between the first holder member 15 and the second holder member 16 assembled on the first plate 11, and the central hole 10c of the coil 10 is filled with an adhesive. Furthermore, the two coil wires 10d that have been drawn out from the coil 10 are drawn out from the notch portion 156 of the first holder side plate portion 152 to the Y1 side. Then, the second plate 12 is placed thereon from the Z2 side and the adhesive is cured. As shown in FIGS. 3 and 4, an adhesive layer 18 of the cured resin is formed in the central hole 10c of the coil 10. As a result, the second plate 12 is fixed to the coil 10 and the first plate 11 via the adhesive layer 18. The adhesive filling the central hole 10c enters the gap between the coil and the first coil holding portion 151 and the gap between the coil and the second coil holding portion 161 and hardens (not illustrated). This completes the coil assembly 13.

The width of the one side plate portion 123 and the other side plate portion 124 of the second plate 12 in the X direction is larger than that of the one side plate portion 113 and the other side plate portion 114 of the first plate 11. Therefore, when the second plate 12 is placed on the coil 10, the first coil holding portion 151, and the second coil holding portion 161 from the Z2 side, as shown in FIGS. 5, 6, and 9, the first coil holding portion 151 is fitted between the fixing bent portions 126 in two locations on the Y1 side of the second plate 12, and the second coil holding portion 161 is fitted between the fixing bent portions 126 in two locations on the Y2 side. Because the fixing bent portions 116 of the first plate 11 are fitted to the recess portions 154 of the first coil holding portion 151 and the recess portions 164 of the second coil holding portion 161, they are covered from the outside by the fixing bent portions 126 of the second plate 12.

When the actuator 1 is manufactured, the coil 10, the first plate 11, the second plate 12, the first holder member 15, and the second holder member 16 are assembled as described above to complete the coil assembly 13. Further, the yoke 8 and the magnet 7 are assembled so as to surround the coil assembly 13 to complete the movable body 5, and the movable body 5 and the coil assembly 13 are connected by the connecting body 4.

Then, the first case member 30 and the second case member 40 are assembled with respect to the coil assembly 13 to accommodate the movable body 5 in the case 2. The power feed substrate 14 may be attached to the coil assembly 13 before assembling the movable body 5, or may be attached after assembling the case 2.

Yoke

The yoke 8 is made of a magnetic material. As shown in FIGS. 3 and 4, the yoke 8 includes a first opposing portion 801 that opposes the coil 10 from the Z1 direction, and a second opposing portion 802 that opposes the coil 10 from the Z2 direction. The first magnet 71 is fixed to the first opposing portion 801. The second magnet 72 is fixed to the second opposing portion 802. Furthermore, as shown in FIG. 4, the yoke 8 is provided with a pair of connection portions 803 that extend in the Z direction from both sides in the X direction of the coil 10. The pair of connection portions 803 connects the first opposing portion 801 and the second opposing portion 802.

When the yoke 8 is assembled, a pair of second joining plate portions 805 that extends in the Z1 direction from both ends of the second opposing portion 802 in the X direction is press-fitted and fixed inside a pair of first joining plate portions 804 that extends in the Z2 direction from both ends of the first opposing portion 801 in the X direction. As a result, the pair of connection portions 803 is formed, and the yoke 8 is assembled in a shape that surrounds the outer peripheral side of the coil 10, the first plate 11, and the second plate 12 (see FIGS. 2 and 4).

As shown in FIGS. 5 and 6, the yoke 8 includes a first yoke 81 and a second yoke 82. The first yoke 81 is configured by two members that are joined together, namely a first inner member 83 that overlaps the coil 10 from the Z1 direction, and a first outer member 84 that overlaps the first inner member 83 from the Z1 direction. The second yoke 82 is configured by two members that are joined together, namely a second inner member 85 that overlaps the coil 10 from the Z1 direction, and a second outer member 86 that overlaps the second inner member 85 from the Z1 direction.

The first opposing portion 801 of the yoke 8 is configured by stacking the first outer member 84 and the first inner member 83 in the Z direction. As shown in FIGS. 5 and 6, the pair of first joining plate portions 804 is provided on the first outer member 84, and extend toward the Z2 direction on both sides of the first inner member 83 and the first magnet 71 in the X direction. The first opposing portion 801 includes a pair of first connecting body fixing portions 806 that extend toward both sides of the first inner member 83 and the first magnet 71 in the Y direction. Each of the pair of first connecting body fixing portions 806 is connected to the first plate 11 via the first connecting bodies 9A.

The second opposing portion 802 of the yoke 8 is configured by stacking the second outer member 86 and the second inner member 85 in the Z direction. As shown in FIGS. 5 and 6, the pair of second joining plate portions 805 is provided on the second outer member 86, and extend toward the Z1 direction on both sides of the second inner member 85 and the second magnet 72 in the X direction. The second opposing portion 802 includes a pair of second connecting body fixing portions 807 that extend toward both sides of the second inner member 85 and the second magnet 72 in the Y direction. Each of the pair of second connecting body fixing portions 807 is connected to the second plate 12 via the second connecting bodies 9B.

Connecting Body

As shown in FIGS. 3, 5, and 6, the first connecting bodies 9A and the second connecting bodies 9B each have a rectangular parallelepiped shape that is long in the X direction. As shown in FIG. 3, the first connecting bodies 9A are positioned on the Z1 side of the coil 10. The second connecting bodies 9B are positioned on the Z2 side of the coil 10. The first connecting bodies 9A are disposed in two locations on the Y1 side and the Y2 side of the first magnet 71, and are formed of two members having the same shape. The second connecting bodies 9B are disposed in two locations on the Y1 side and the Y2 side of the second magnet 72, and are formed of two members having the same shape. The first connecting bodies 9A and the second connecting bodies 9B each exhibit at least one of elasticity and viscoelasticity.

As described above, the first connecting bodies 9A are sandwiched between the first opposing portion 801 of the yoke 8 and the first plate 11 on both sides of the coil 10 in the Y direction. The first connecting bodies 9A are compressed between the first opposing portion 801 and the first plate 11 in the Z direction. As described above, the second connecting bodies 9B are sandwiched between the second opposing portion 802 of the yoke 8 and the second plate 12 on both sides of the coil 10 in the Y direction. The second connecting bodies 9B are compressed between the second opposing portion 802 and the second plate 12 in the Z direction.

In the present embodiment, the first connecting bodies 9A and the second connecting bodies 9B are gel-like members made from silicone gel. Silicone gel is a viscoelastic body whose spring constant when deformation occurs in an expanding/contracting direction is approximately three times greater than the spring constant when deformation occurs in a shear direction. When a viscoelastic body is deformed in the direction that intersects a thickness direction (shear direction), because this is a deformation in a direction in which the viscoelastic body is pulled and stretched, the viscoelastic body has deformation characteristics in which the linear component is larger than the nonlinear component. Furthermore, when a viscoelastic body is subjected to compression deformation by being pressed in the thickness direction, it has expansion/contraction characteristics in which the nonlinear component is larger than the linear component, but on the other hand, when the viscoelastic body is pulled and stretched in the thickness direction, it has expansion/contraction characteristics in which the linear component is larger than the nonlinear component.

Alternatively, the first connecting bodies 9A and the second connecting bodies 9B may be formed using various rubber materials such as natural rubber, diene rubber (such as styrene-butadiene rubber, isoprene rubber, butadiene rubber, chloroprene rubber, and acrylonitrile-butadiene rubber), non-diene rubber (such as butyl rubber, ethylene-propylene rubber, ethylene-propylene-diene rubber, urethane rubber, silicone rubber, and fluoro-rubber), thermoplastic elastomers, and modified materials of these rubber materials.

Figure 10:
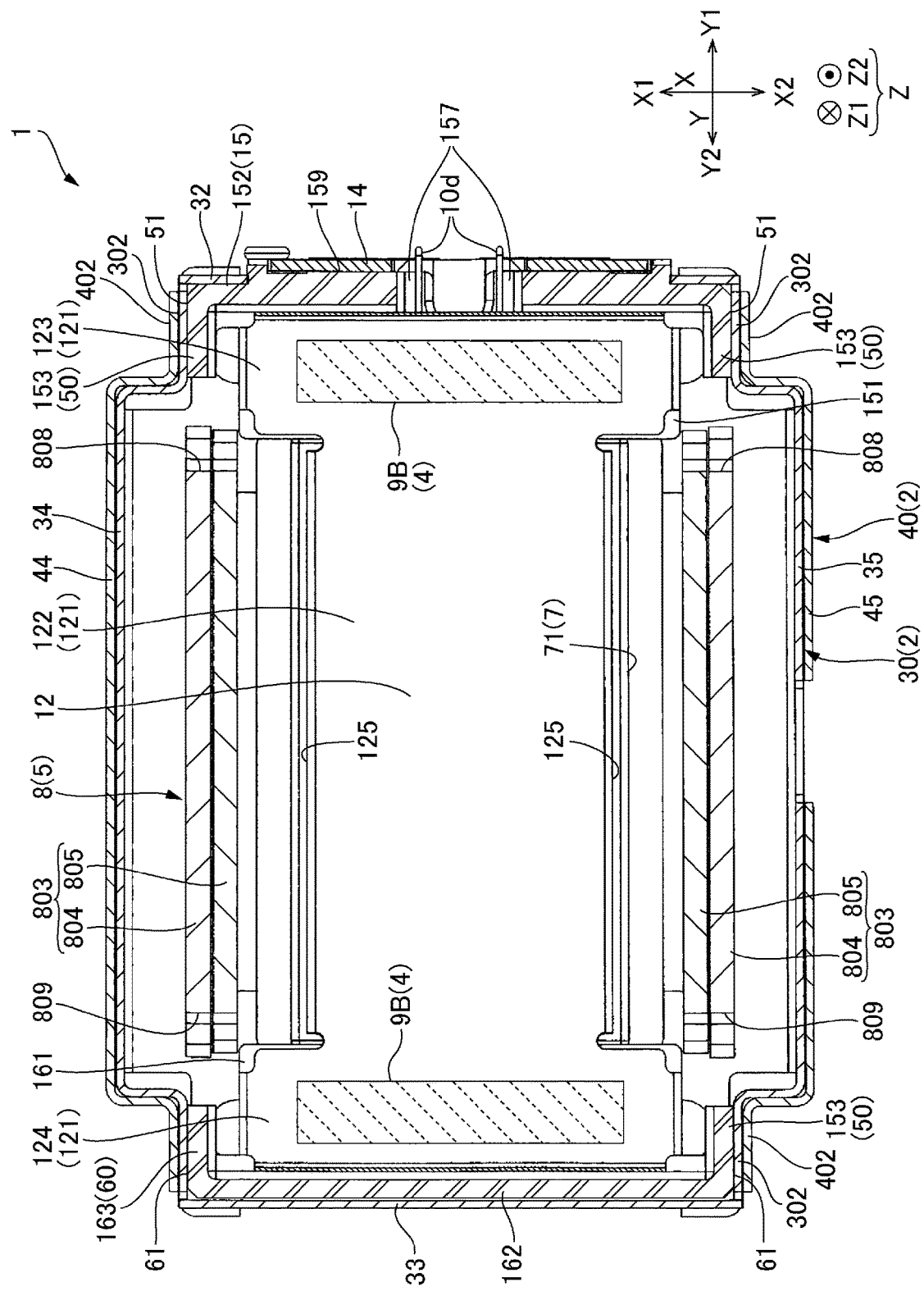
FIG. 10 is a cross-sectional view of an actuator showing the plan view shape and arrangement of a connecting body (a cross-sectional view taken along position D-D in FIG. 3).

FIG. 10 is a cross-sectional view of the actuator 1 showing the plan view shape and arrangement of the connecting body 4, and is a cross-sectional view taken along position D-D in FIG. 3. As shown in FIG. 10, the second connecting bodies 9B are connected to the one side plate portion 123 and the other side plate portion 124 of the second plate 12. As shown in FIG. 10, the length of the second connecting bodies 9B is larger than the width of the central plate portion 122 in the X direction, and larger than the width of the coil 10, which is covered by the central plate portion 122, in the X direction.

The first connecting bodies 9A have the same shape as the second connecting bodies 9B, and are disposed in the same positions as the second connecting bodies 9B when viewed from the Z direction. The first connecting bodies 9A are connected to the one side plate portion 113 and the other side plate portion 114 of the first plate 11. The length of the first connecting bodies 9A is larger than the width of the central plate portion 112 in the X direction, and larger than the width of the coil 10, which is covered by the central plate portion 112, in the X direction.

Detailed Shape of Yoke

Figure 11:
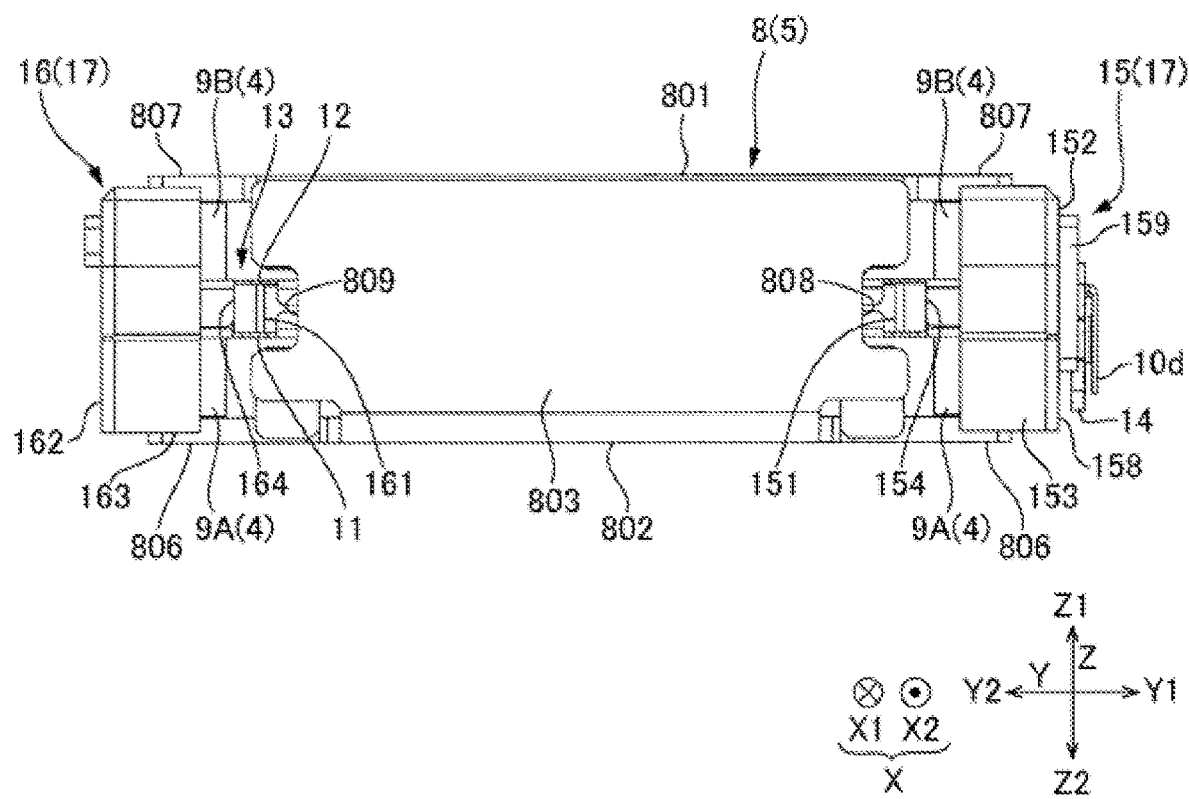
FIG. 11 is a side view of a movable body, a connecting body, and a coil assembly when viewed from an X2 direction.

FIG. 11 is a side view of the movable body 5, the connecting body 4, and the coil assembly 13 when viewed from the X2 direction. As described above, in the yoke 8, both end parts of the first opposing portion 801 and the second opposing portion 802 in the Y direction protrude on the Y1 side and the Y2 side of the connection portions 803. Further, the first connecting body fixing portions 806 and the first connecting bodies 9A are disposed on the Z2 side at both ends of the connection portions 803 in the Y direction, and the second connecting body fixing portions 807 and the second connecting bodies 9B are disposed on the Z1 side at both ends of the connection portions 803 in the Y direction. That is, as shown in FIGS. 10 and 11, in the yoke 8, both sides of the pair of connection portions 803 in the Y direction are notched in a shape that exposes the first connecting bodies 9A and the second connecting bodies 9B when viewed from the X direction. As shown in FIG. 10, the first connecting bodies 9A and the second connecting bodies 9B oppose the first holder projection portions 153 of the first holder member 15 and the second holder projection portions 163 of the second holder member 16 in the X direction.

When the movable body 5 is assembled around the coil assembly 13, the connection portions 803 of the yoke 8 is disposed in the space between the leading edges of the first holder projection portions 153 in the Y2 direction and the leading edges of the second holder projection portions 163 in the Y1 direction (see FIGS. 2 and 9). Here, each of the pair of connection portions 803 is provided with a first notch portion 808, in which a central part in the Z direction of the edge on the Y1 side is notched toward the Y2 side, and a second notch portion 809, in which a central part in the Z direction of the edge on the Y2 side is notched toward the Y1 side (see FIGS. 2 and 11). As shown in FIG. 11, when viewed from the X direction, the end portion of the first coil holding portion 151 on the Y2 side is disposed in the first notch portion 808, and the end portion of the second coil holding portion 161 on the Y1 side is disposed in the second notch portion 809. That is, in the yoke 8, both end portions of the pair of connection portions 803 in the Y direction are notched in a shape that does not interfere with first coil holding portion 151 and the second coil holding portion 161.

Furthermore, when the movable body 5 is assembled around the coil assembly 13, as shown in FIG. 2, the first connecting body fixing portion 806 provided on the end portion of the first opposing portion 801 on the Y1 side and the second connecting body fixing portion 807 provided on the end portion of the second opposing portion 802 on the Y1 side are disposed between the pair of first holder projection portions 153 that are opposed in the X direction. In addition, the first connecting body fixing portion 806 provided on the end portion of the first opposing portion 801 on the Y2 side and the second connecting body fixing portion 807 provided on the end portion of the second opposing portion 802 on the Y2 side are disposed between the pair of second holder projection portions 163 that are opposed in the X direction. Therefore, the first holder projection portions 153 and the second holder projection portions 163 of the coil holder 17 collide with the first connecting body fixing portions 806 and the second connecting body fixing portions 807 and act as stoppers that regulate excessive movement of the movable body 5 when the movable body 5 moves significantly in the X direction due to an impact or the like.

Case

As shown in (a) and (b) of FIG. 1 and FIG. 2, the first case member 30 includes a first end plate portion 31 having a substantially rectangular shape that opposes the coil 10 from the Z1 direction. Furthermore, the first case member 30 includes a first case first side plate portion 32 that extends toward the Z2 direction from the end of the first end plate portion 31 in the Y1 direction, a first case second side plate portion 33 that extends toward the Z2 direction from the end of the first end plate portion 31 in the Y2 direction, a first case third side plate portion 34 that extends toward the Z2 direction from the end of the first end plate portion 31 in the X1 direction, and a first case fourth side plate portion 35 that extends toward the Z2 direction from the end of the first end plate portion 31 in the X2 direction.

The edges of the first end plate portion 31 in the X direction are provided with projection parts in a central part in the Y direction that protrude on both sides in the X direction. As a result, the first case third side plate portion 34 and the first case fourth side plate portion 35 are each provided with a side plate central portion 301 that extends from the leading edge of the projection parts on the first end plate portion 31 toward the Z1 direction, and side plate end parts 302 that are provided in positions shifted further toward the inside (central side of the first case member 30 in the X direction) than the side plate central portion 301, in both sides of the side plate central portion 301 in the Y direction. Both ends of the side plate central portion 301 in the Y direction are connected to a step portion that is substantially bent in a right angle toward the inside. The side plate central portion 301 and the side plate end parts 302 are connected via the step portions.

As shown in FIG. 2, the first case first side plate portion 32 has a shape that does not interfere with the substrate fixing portion 159 provided on the first holder side plate portion 152, and is notched in a shape that surrounds the Z1 side, the X1 side, and the X2 side of the substrate fixing portion 159. The first case second side plate portion 33 is provided with circular first projection portions 36 that protrude toward the inside (Y1 direction) of the first case member 30. The first projection portions 36 are half punched portions formed by deforming a metal plate into a shape that protrudes in the Y1 direction by press working. Therefore, the first projection portions 36 have a surface on the Y2 side with a concave shape that is recessed toward the Y1 side, and have a surface on the Y1 side with a convex shape that protrudes toward the Y1 side. The first projection portions 36 are formed in a leading edge part of the first case second side plate portion 33 in the Z2 direction in two locations that are separated in the X direction.

In the present embodiment, when the first case member 30 is assembled with respect to the coil assembly 13, the coil holder 17 is fitted between the first case second side plate portion 33 and the first case first side plate portion 32. At this time, as shown in the partially enlarged view shown in FIG. 9, the first projection portions 36 provided in two locations on the first case second side plate portion 33 make contact with the second holder side plate portion 162, which is disposed on the end portion of the coil holder 17 on the Y2 side. The first projection portions 36 make elastic contact with the first case second side plate portion 33 from the Y2 side and press the coil holder 17 to the Y1 side. As a result, the coil holder 17 is biased in the Y1 direction inside the first case member 30, and the first holder side plate portion 152 provided on the end portion of the coil holder 17 on the Y1 side is pressed against the first case first side plate portion 32 from the Y2 side (see FIGS. 3 and 9). Consequently, the coil holder 17 is positioned with respect to the first case member 30 in a state where it does not rattle in the Y direction.

The substrate fixing portion 159 provided on the coil holder 17 protrudes on the Y1 side from the notch provided in the first case first side plate portion 32 as described above. As shown in FIG. 3, in the present embodiment, the side surface of the first holder side plate portion 152 in the Y1 direction (contact surface 158) is making contact with the first case first side plate portion 32, and the step between the substrate fixing portion 159 and the contact surface 158 is larger than the plate thickness of the first case first side plate portion 32. As a result, the end portion of the power feed substrate 14 on the Z1 side, which extends toward the Z1 side of the substrate fixing portion 159, does not make contact with the first case first side plate portion 32, and a space S (see FIG. 3) in the Y direction is formed between the power feed substrate 14 and the first case first side plate portion 32. Therefore, it is possible to prevent the pattern on the power feed substrate 14 from being short-circuited due to contact with the case 2.

Next, the second case member 40 includes a second end plate portion 41 having a substantially rectangular shape that opposes the coil 10 from the Z2 direction. Furthermore, the second case member 40 includes a second case first side plate portion 42 that extends toward the Z1 direction from the end of the second end plate portion 41 in the Y1 direction, a second case second side plate portion 43 that extends toward the Z1 direction from the end of the second end plate portion 41 in the Y2 direction, a second case third side plate portion 44 that extends toward the Z1 direction from the end of the second end plate portion 41 in the X1 direction, and a second case fourth side plate portion 45 that extends toward the Z1 direction from the end of the second end plate portion 41 in the X2 direction.

The edges of the second end plate portion 41 in the X direction are provided with projection parts in a central part in the Y direction that protrudes on both sides in the X direction. As a result, the second case third side plate portion 44 and the second case fourth side plate portion are each provided with a side plate central portion 401 that extends from the leading edge of the projection parts on the second end plate portion 41 toward the Z2 direction, and side plate end parts 402 that are provided on both sides of the side plate central portion 401 in positions shifted further toward the inside (central side of the second case member 40 in the X direction) than the side plate central portion 401, in both sides of the side plate central portion 401 in the Y direction. Both ends of the side plate central portion 401 in the Y direction are connected to a step portion that is substantially bent in a right angle toward the inside. The side plate central portion 401 and the side plate end parts 402 are connected via the step portions.

The first case member 30 and the second case member 40 are positioned as a result of the pair of first side plate portions provided on both ends of the first case member 30 in the X direction (that is, the first case third side plate portion 34 and the first case fourth side plate portion 35) being press-fitted between the pair of second side plate portions provided on both ends of the second case member 40 in the X direction (that is, the second case third side plate portion 44 and the second case fourth side plate portion 45). After being temporarily fixed by press-fitting, the first case member 30 and the second case member 40 are fully fixed by welding the location where the second case third side plate portion 44 and the first case third side plate portion 34 overlap each other and the location where the second case fourth side plate portion 45 and the first case fourth side plate portion 35 overlap each other.

As shown in FIG. 2, the second case third side plate portion 44 is provided with second projection portions 46 that protrude in the X2 direction (that is, toward the inside of the second case member 40). Similarly, the second case fourth side plate portion 45 is provided with third projection portions 47 that protrude in the X1 direction (that is, toward the inside of the second case member 40). The second projection portions 46 and the third projection portions 47 are formed in two locations on both ends of the side plate central portion 401 in the Y direction, and formed in one location on each of the side plate end parts 402 provided on both sides of the side plate central portion 401. The second projection portions 46 and the third projection portions 47 are half punched portions having the same shape as the first projection portions 36.

The second projection portions 46 and the third projection portions 47 are formed in opposing positions in the X direction. The pair of first side plate portions (the first case third side plate portion 34 and the first case fourth side plate portion 35) of the first case member 30 are press-fitted between the opposing second projection portions 46 and third projection portions 47. As shown in the partially enlarged view of FIG. 9, the second projection portions 46 make elastic contact with the first case third side plate portion 34 from the X1 side. Furthermore, the third projection portions 47 make elastic contact with the first case fourth side plate portion 35 from the X2 side.

As described below, in the present embodiment, because the coil holder 17 is press-fitted between the first case third side plate portion 34 and the first case fourth side plate portion 35, a pressing force in directions expanding toward both sides in the X direction always acts on the first case third side plate portion 34 and the first case fourth side plate portion 35. Therefore, when the first case member 30 and the second case member 40 are assembled, a state is formed in which a pressing force that presses outward from the first case third side plate portion 34 and the first case fourth side plate portion 35 always acts on the second case third side plate portion 44 and the second case fourth side plate portion 45.

Press-Fitted Fixed Portion

The coil holder 17 is fixed to the case 2 as a result of the first holder member 15 and the second holder member 16 each being press-fitted inside the first case member 30. As shown in FIGS. 2 and 9, the first holder member 15 includes a press-fitted fixed portion 50 that is press-fitted between the first case third side plate portion 34 and the first case fourth side plate portion 35. Furthermore, the second holder member 16 includes a press-fitted fixed portion 60 that is press-fitted between the first case third side plate portion 34 and the first case fourth side plate portion 35.

Figure 12:
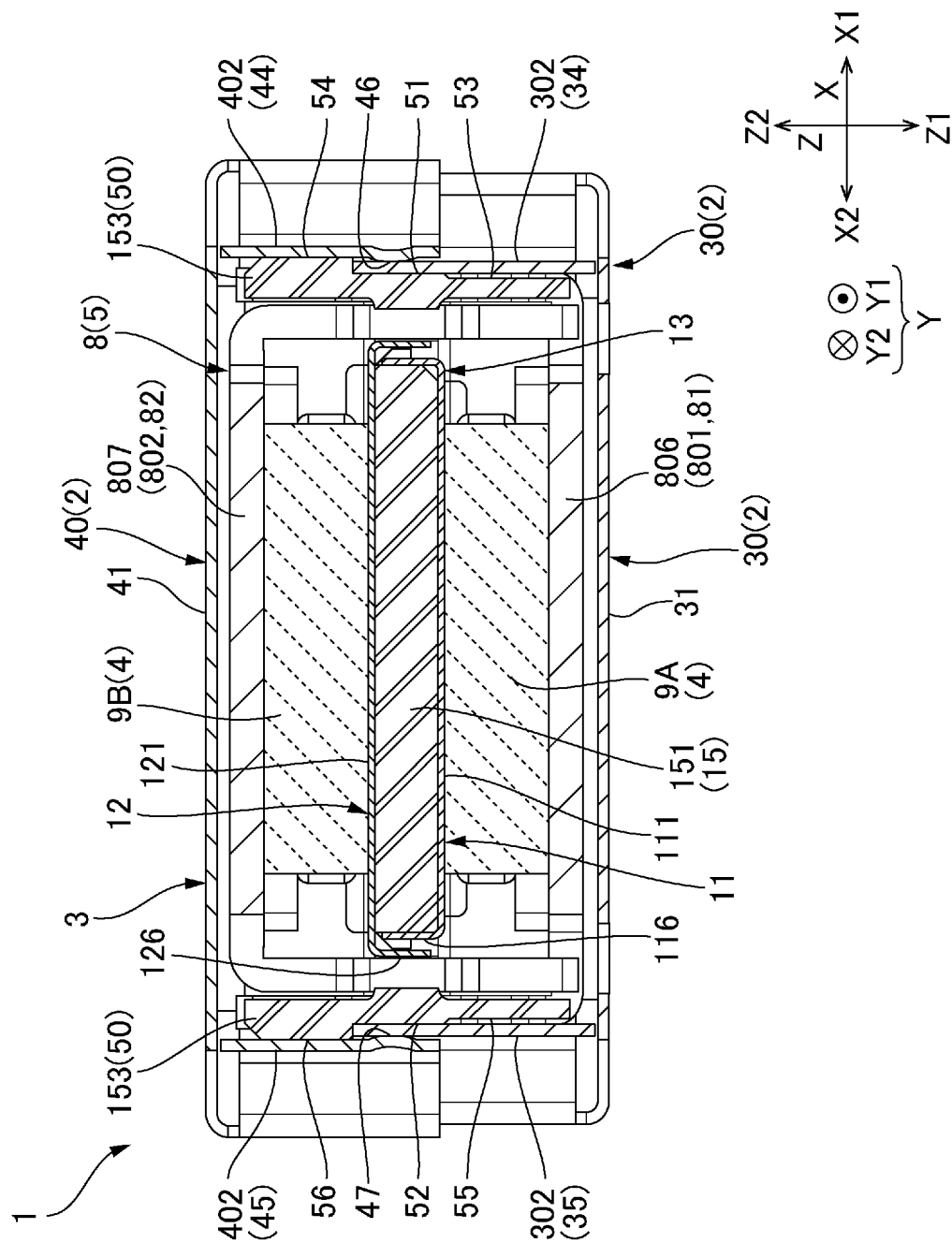
FIG. 12 is a cross-sectional view of an actuator taken at the position of a press-fitted fixed portion (a cross-sectional view taken along position E-E in FIG. 9).

FIG. 12 is a cross-sectional view of the actuator 1 taken at the position of the press-fitted fixed portion 50 (a cross-sectional view taken along position E-E in FIG. 9). In the first holder member 15, the first holder side plate portion 152 and the first holder projection portions 153 constitute the press-fitted fixed portion 50. As shown in FIGS. 9 and 12, the press-fitted fixed portion 50 is press-fitted between the pair of side plate end parts 302 provided on the end portion of the first case third side plate portion 34 and the first case fourth side plate portion 35 in the Y1 direction.

As shown in FIGS. 9 and 12, the end portion of the press-fitted fixed portion 50 in the X1 direction (that is, the first holder projection portion 153 on the X1 side) includes a one side fixing surface 51 that makes contact with the side plate end part 302 of the first case third side plate portion 34 from the inside. The end portion of the press-fitted fixed portion 50 in the X2 direction (that is, the first holder projection portion 153 on the X2 side) includes an other side fixing surface 52 that makes contact with the side plate end part 302 of the first case fourth side plate portion 35 from the inside.

As shown in FIGS. 2, 7 and 12, the one side fixing surface 51 and the other side fixing surface 52 is provided on a central part of the press-fitted fixed portion 50 in the Z direction. The Z1 side and the Z2 side of the one side fixing surface 51 and the other side fixing surface 52 are each provided with step portions in the X direction. That is, the end portion of the press-fitted fixed portion 50 in the X1 direction is provided with a one side recess portion 53 on the Z1 side of the one side fixing surface 51 that is more recessed than the one side fixing surface 51 in the X2 direction, and a one side projection portion 54 on the Z2 side of the one side fixing surface 51 that protrudes further in the X1 direction than the one side fixing surface 51. Similarly, the end portion of the press-fitted fixed portion 50 in the X2 direction is provided with an other side recess portion 55 on the Z1 side of the other side fixing surface 52 that is more recessed than the other side fixing surface 52 in the X1 direction, and an other side projection portion 56 on the Z2 side of the other side fixing surface 52 that protrudes further in the X2 direction than the other side fixing surface 52.

As shown in FIG. 12, in the press-fitted fixed portion 50, the one side fixing surface 51 and the other side fixing surface 52 provided in a central part in the Z direction make contact with the leading edge parts of the first case third side plate portion 34 and the first case fourth side plate portion 35 in the Z2 direction, and the parts in the Z1 direction (the one side recess portion 53 and the other side recess portion 55) do not make contact with the first case third side plate portion 34 and the first case fourth side plate portion 35. Therefore, the press-fitted fixed portion 50 presses the leading edge parts of the first case third side plate portion 34 and the first case fourth side plate portion 35, which are in the Z2 direction, in directions expanding toward the outside (both sides in the X direction).

The press-fitted fixed portion 50 is positioned in the Z direction with respect to the first case member 30 as a result being press-fitted to a position in which the leading edges of the first case third side plate portion 34 and the first case fourth side plate portion 35 each make contact with a step portion between the one side projection portion 54 and the one side fixing surface 51 and a step portion between the other side projection portion 56 and the other side fixing surface 52. The end portions of the press-fitted fixed portion 50 in the Z2 direction (the one side projection portion 54 and the other side projection portion 56) are covered from the outside (both sides in the X direction) by the second case third side plate portion 44 and the second case fourth side plate portion 45 of the second case member 40.

Next, in the second holder member 16, the second holder side plate portion 162 and the second holder projection portions 163 constitute the press-fitted fixed portion 60 (see FIGS. 2, 7 and 9). The press-fitted fixed portion 60 is press-fitted between the pair of side plate end parts 302 provided on the end portion of the first case third side plate portion 34 and the first case fourth side plate portion 35 in the Y2 direction.

The press-fitted fixed portion 60 is configured in the same manner as the press-fitted fixed portion 50. That is, the end portion of the press-fitted fixed portion 60 in the X1 direction includes a one side fixing surface 61 that makes contact with the side plate end part 302 of the first case third side plate portion 34 from the inside, a one side recess portion 63 on the Z1 side of the one side fixing surface 61 that is more recessed than the one side fixing surface 61 in the X2 direction (see FIG. 6), and a one side projection portion 64 on the Z2 side of the one side fixing surface 61 that protrudes further in the X1 direction than the one side fixing surface 61. Furthermore, the end portion of the press-fitted fixed portion 60 in the X2 direction is provided with an other side fixing surface 62 that makes contact with the side plate end part 302 of the first case fourth side plate portion 35 from the inside, an other side recess portion 65 on the Z1 side of the other side fixing surface 62 that is more recessed than the other side fixing surface 62 in the X1 direction, and an other side projection portion 66 on the Z2 side of the other side fixing surface 62 that protrudes further in the X2 direction than the other side fixing surface 62.

In the press-fitted fixed portion 60, the one side fixing surface 61 and the other side fixing surface 62 provided in a central part in the Z direction make contact with the leading edge parts of the first case third side plate portion 34 and the first case fourth side plate portion 35, and the end portions in the Z1 direction (the one side recess portion 63 and the other side recess portion 65) do not make contact with the first case third side plate portion 34 and the first case fourth side plate portion 35. Therefore, the press-fitted fixed portion 60 presses the leading edge parts of the first case third side plate portion 34 and the first case fourth side plate portion 35, which are in the Z2 direction, in directions expanding toward the outside (both sides in the X direction).

Furthermore, the press-fitted fixed portion 60 is positioned in the Z direction with respect to the first case member 30 as a result being press-fitted to a position in which the leading edges of the first case third side plate portion 34 and the first case fourth side plate portion 35 each make contact with a step portion between the one side projection portion 64 and the one side fixing surface 61 and a step portion between the other side projection portion 66 and the other side fixing surface 62. The end portions of the press-fitted fixed portion 60 in the Z2 direction (the one side projection portion 64 and the other side projection portion 66) are covered from the outside (both sides in the X direction) by the second case third side plate portion 44 and the second case fourth side plate portion 45 of the second case member 40.

As a result of such a fixing structure, the pair of first side plate portions (the first case third side plate portion 34 and the first case fourth side plate portion 35) of the first case member are always pressed toward the outside by a pressing force from the press-fitted fixed portions 50 and 60. Therefore, a state is formed in which the first case third side plate portion 34 and the first case fourth side plate portion 35 are always pressed from the inside against the pair of second side plate portions (the second case third side plate portion 44 and the second case fourth side plate portion 45) of the second case member 40 that has been placed on the first case member 30. Therefore, the first case member 30 is positioned with respect to the second case member 40 in a state where it does not rattle.

Main Effects of Present Embodiment

As described above, the actuator 1 of the present embodiment includes: the movable body 5; the support body 3 provided with the case 2 that accommodates the movable body 5, and the coil holder 17; the connecting body 4 connected to the movable body 5 and the support body 3; and the magnetic drive circuit 6 which includes the coil 10 held by coil holder 17 and the magnet 7 that opposes the coil 10 in the Z direction (first direction), and causes the movable body 5 to vibrate with respect to the support body 3 in the X direction (second direction). The support body 3 includes the metallic first plate 11 that overlaps the coil 10 from the Z1 direction, and the metallic second plate 12 that overlaps the coil 10 from the Z2 direction. The movable body 5 is provided with the yoke 8 which holds the magnet 7. The yoke 8 includes: the first yoke 81 provided with the first opposing portion 801 that opposes the first plate 11 from the Z1 direction, and the pair of first joining plate portions 804 that extend in the Z2 direction from both ends of the first opposing portion 801 in the X direction; and the second yoke 82 provided with the second opposing portion 802 that opposes the second plate 12 from the Z2 direction, and the pair of second joining plate portions 805 that extend in the Z1 direction from both ends of the second opposing portion 802 in the X direction and are fitted inside the pair of first joining plate portions 804. The connecting body 4 is provided with the pair of first connecting bodies 9A that connect the pair of first connecting body fixing portions 806 provided on both ends of the first opposing portion 801 in the Y direction (third direction) and the first plate 11. In the yoke 8, both sides of the first connecting bodies 9A in the X direction are notched.

According to the present embodiment, in the yoke 8 that configures the movable body 5, the thickness of the connection portions 803 disposed on both sides of the coil 10 in the X direction is twice the plate thickness. Furthermore, the first connecting bodies 9A are disposed inside the yoke 8 (in positions in which the first plate 11 and the yoke 8 are opposed in the Z direction). The yoke 8 has a shape in which both sides of the first connecting bodies 9A in the X direction are notched. In this way, by notching both ends of the yoke 8 in the Y direction into a shape that exposes the entire first connecting bodies 9A when viewed from the X direction, the width of the space in the X direction in which the first connecting bodies 9A can be disposed can be made larger without increasing the size of the outer shape of the movable body 5. Therefore, the length of the first connecting bodies 9A in the X direction can be made longer. Furthermore, by increasing the thickness of the connection portions 803, the weight of the movable body 5 can be ensured even when both sides of the first connecting bodies 9A in the X direction have been notched. As a result, it is possible to avoid an increase in size of the actuator 1 and ensure the weight of the movable body 5. Also, because the length of the first connecting bodies 9A in the X direction can be ensured, it is possible to prevent the movable body 5 from swinging like a pendulum (pendulum motion) instead of moving forward when it vibrates.

In the present embodiment, the connecting body 4 is provided with the pair of second connecting bodies 9B that connect each of the pair of second connecting body fixing portions 807 provided on both ends of the second opposing portion 802 in the Y direction and the second plate 12. In the yoke 8, both sides of the second connecting bodies 9B in the X direction are notched. In this way, like the first connecting bodies 9A, the second connecting bodies 9B are disposed inside the yoke 8 (in positions in which the first plate 11 and the yoke 8 are opposed in the Z direction). Further, because both ends of the yoke 8 in the Y direction are notched into a shape that exposes the entire second connecting bodies 9B when viewed from the X direction, the width of the space in the X direction in which the second connecting bodies 9B can be disposed can be made larger without an increase in size of the outer shape of the movable body 5. Therefore, because the length of the second connecting bodies 9B in the X direction can be ensured, the effect of suppressing the pendulum motion when the movable body 5 vibrates can be enhanced.

In the present embodiment, because the pendulum motion of the movable body 5 can be suppressed, the movable body 5 and the support body 3 do not collide even when the gap between the movable body 5 and the support body 3 in the Z direction is made small. Therefore, the dimensions of the actuator 1 in the Z direction can be made small. Furthermore, by making the gap between the movable body 5 and the support body 3 in the Z direction small, the driving force of the magnetic drive circuit 6 can be made larger. Therefore, large vibrations can be generated. Alternatively, the movable body 5 can be vibrated with a low power consumption.

In the present embodiment, the coil holder 17 is provided with: the first holder member 15, which includes the first coil holding portion 151 disposed in the Y1 direction with respect to the coil 10, and the first holder side plate portion 152 that extends in the Z direction from the end of the first coil holding portion 151 in the Y1 direction; and the second holder member 16, which includes the second coil holding portion 161 disposed in the Y2 direction with respect to the coil and the second holder side plate portion 162 that extends in the Z direction from the end of the second coil holding portion 161 in the Y2 direction. The width of the first coil holding portion 151 and the second coil holding portion 161 in the X direction is larger than the width of the coil 10 in the X direction. The pair of first connecting bodies 9A and the pair of second connecting bodies 9B overlap the first coil holding portion 151 and the second coil holding portion 161 from the Z1 direction. As a result, by dividing the coil holder 17 into two members by dividing it in the Y direction, a resin part that covers both sides of the coil 10 in the X direction becomes unnecessary. Therefore, the external dimensions of the actuator 1 in the X direction can be reduced. Alternatively, the coil 10 can be made larger without an increase in the outer shape of the actuator 1, and the thrust of the magnetic drive circuit 6 can be increased to generate large vibrations. Furthermore, the dimensions of the first coil holding portion 151 and the second coil holding portion 161 in the X direction is large. Therefore, a space to attach the first connecting bodies 9A and the second connecting bodies 9B having a long dimension in the X direction can be ensured.

In the present embodiment, the yoke 8 is provided with the pair of connection portions 803, which extend in the Z direction on both sides of the coil 10 in the X direction and connect the first opposing portion 801 and the second opposing portion 802. Also, each of the connection portions 803 is configured by stacking the first joining plate portions 804 and the second joining plate portions 805. The first coil holding portion 151 is disposed in the first notch portions 808, in which an edge of each of the pair of connection portions 803 is notched in the Y1 direction when viewed from the X direction. The second coil holding portion 161 is disposed in the second notch portions 809, in which an edge of each of the pair of connection portions 803 is notched in the Y2 direction when viewed from the X direction. In this way, even when the width of the first coil holding portion 151 and the second coil holding portion 161 in the X direction is made larger, interference of the first coil holding portion 151 and the second coil holding portion 161 with the yoke 8 can be avoided. Therefore, the width in the X direction of the space in which the first connecting bodies 9A and the second connecting bodies 9B can be disposed can be made larger without an increase in size of the outer shape of the movable body 5.

In the present embodiment, the first holder member 15 includes the pair of first holder projection portions 153 that protrude toward the Y2 direction from both ends of the first holder side plate portion 152 in the X direction. The second holder member 16 includes the pair of second holder projection portions 163 that protrude toward the Y1 direction from both ends of the second holder side plate portion 162 in the X direction. One of the pair of first connecting body fixing portions 806 (the first connecting body fixing portion 806 on the Y1 side) is disposed between the pair of first holder projection portions 153, and the other of the pair of first connecting body fixing portions 806 (the first connecting body fixing portion 806 on the Y2 side) is disposed between the pair of second holder projection portions 163. Furthermore, the pair of second connecting body fixing portions 807 is similarly disposed between the pair of first holder projection portions 153 and the pair of second holder projection portions 163. As a result, the first holder projection portions 153 and the second holder projection portions 163 function as stoppers that regulate the movable range of the movable body 5 in the X direction. In this way, by providing stoppers on the coil holder 17 instead of the case 2, it is less likely that the movable body 5 will collide with the case 2 and be deformed or destroyed due to an impact caused by falling or the like. Therefore, the impact resistance of the actuator 1 can be increased.

In the present embodiment, the case 2 includes the first case member 30 provided with the first end plate portion 31 that opposes the movable body 5 from the Z1 direction, and the pair of first case side plate portions (the first case third side plate portion 34 and the first case fourth side plate portion 35) that extend toward the Z2 direction from the edges of the first end plate portion 31 on both sides in the X direction. Further, the first holder projection portions 153 and the second holder projection portions 163 are press-fitted between the pair of first case side plate portions (the first case third side plate portion 34 and the first case fourth side plate portion 35). Therefore, because the parts that function as stoppers can be used as press-fitted fixed portions with respect to the case 2, the coil holder 17 can be prevented from rattling with respect to the case 2. In addition, the coil holder 17 can be fixed to the case 2 without using an adhesive. Therefore, it is possible to obtain good ease of assembly.

In the present embodiment, the first plate 11 includes: the central plate portion 112 disposed between the pair of connection portions 803 and overlaps the coil 10; the one side plate portion 113 that extends from the central plate portion 112 in the Y1 direction and overlaps the first coil holding portion 151; and the other side plate portion 114 that extends from the central plate portion 112 in the Y2 direction and overlaps the second coil holding portion 161. Furthermore, the second plate 12 includes: the central plate portion 122 disposed between the pair of connection portions 803 and overlaps the coil 10, the one side plate portion 123 that extends from the central plate portion 122 in the Y1 direction and overlaps the first coil holding portion 151, and the other side plate portion 124 that extends from the central plate portion 122 in the Y2 direction and overlaps the second coil holding portion 161. Both ends of the central plate portions 112 and 122 of each plate in the X direction are provided with the central bent portions 115 and 125 that are bent in the Z direction and cover the side surface of the coil 10 in the X direction. Furthermore, the width of the one side plate portions 113 and 123 and the other side plate portions 114 and 124 in the X direction is larger than the width of the central plate portions 112 and 122 in the X direction. Also, one of the pair of first connecting bodies 9A is connected to the one side plate portion 113 of the first plate 11, and the other of the pair of first connecting bodies 9A is connected to the other side plate portion 114 of the first plate 11. In this way, it is possible to ensure a space at both ends of the first plate 11 and the second plate 12 in the Y direction to attach the first connecting bodies 9A and the second connecting bodies 9B having a long dimension in the X direction. Furthermore, because the coil 10 can be protected by the first plate 11 and the second plate 12, the possibility that the coil 10 will be damaged due to collision with the magnet 7 or collision with the yoke 8 is low.

In the present embodiment, the length of the first connecting bodies 9A and the second connecting bodies 9B in the X direction is larger than the width of the coil 10 in the X direction, and is greater than the width of the central plate portions 112 and 122 in the X direction. In this way, by making the length of the first connecting bodies 9A and the second connecting bodies 9B long in the X direction, the effect of suppressing the pendulum motion when the movable body 5 vibrates can be enhanced.

In the present embodiment, both ends of the one side plate portion 113 of the first plate 11 in the X direction and both ends of the other side plate portion 114 of the first plate 11 in the X direction are each provided with the fixing bent portions 116 that are bent in the Z2 direction and lock the end surfaces on both sides of the first coil holding portion 151 in the X direction and the end surfaces on both sides of the second coil holding portion 161 in the X direction. Therefore, the coil assembly 13 can be assembled by locking and positioning the first plate 11 with respect to the first holder member 15 and the second holder member 16. As a result, a reduction in the ease of assembly of the actuator 1 can be suppressed even when the coil holder 17 is divided into two members.

In the present embodiment, the first yoke 81 includes the flat plate-shaped first inner member 83 that overlaps the coil 10 from the Z1 direction, and the first outer member 84 that overlaps the first inner member 83 from the Z1 direction. The second yoke 82 includes the flat plate-shaped second inner member 85 that overlaps the coil 10 from the Z2 direction, and the second outer member 86 that overlaps the second inner member 85 from the Z2 direction. In this way, because the thickness of the parts opposing the coil 10 in the Z direction (first direction) is increased as a result of the stacking two members, the weight of the movable body 5 can be ensured. Furthermore, because the weight of the yoke 8 can be ensured by using members having the plate thickness of a general-purpose product, an increase in cost of the components constituting the yoke 8 can be avoided.

Modifications (1) In the above embodiment, the first connecting bodies 9A and the second connecting bodies 9B are provided as the connecting body 4. However, a configuration is possible in which only one of the first connecting bodies 9A and the second connecting bodies 9B is provided.

(2) In the above embodiment, the first magnet 71 and the second magnet 72 are provided as the magnet 7. However, a configuration is possible in which only one of the first magnet 71 and the second magnet 72 are provided.

(3) In the above embodiment, in the yoke 8, the first yoke 81 and the second yoke 82 are each configured stacking an inner member and an outer member. However, the first yoke 81 and the second yoke 82 may each be configured by only an outer member.

(4) In the above embodiment, the yoke 8 has the pair of second joining plate portions 805 press-fitted inside the pair of first joining plate portion 804. However, a configuration is also possible in which the pair of first joining plate portions 804 is press-fitted inside the pair of second joining plate portions 805.

(5) In the above embodiment, the coil holder 17 is split into two parts in the Y direction and is configured by two members. However, the coil holder 17 may be configured by a single member. For example, the coil holder 17 can be configured having a coil placement hole provided in a plate portion connecting the first holder side plate portion 152 and the second holder side plate portion 162.

(6) The above embodiment has a configuration in which projection portions (the second projection portions 46 and the third projection portions 47) that protrude toward the inside are provided on the side plates of the second case member 40 in the X direction (the second case third side plate portion 44 and the second case fourth side plate portion 45). However, the projection portions may be provided on either of the first case member 30 and the second case member 40. That is, the second projection portions that protrude toward the outside may be provided on the first case third side plate portion 34, and the third projection portions that protrude toward the outside may be provided on the first case fourth side plate portion 35.

What is claimed is:

1. An actuator comprising:
   a movable body;
   a support body provided with a case that accommodates the movable body, and a coil holder;
   a connecting body that is connected to the movable body and the support body; and
   a magnetic drive circuit provided with a coil that is held by the coil holder, and magnet that opposes the coil in a first direction, and causes the movable body to vibrate with respect to the support body in a second direction that intersects the first direction; wherein
   the support body is provided with a metallic first plate that overlaps the coil from one side in the first direction, a metallic second plate that overlaps the coil from an other side in the first direction,
   the movable body includes a yoke that holds the magnet,
   the yoke has a first yoke provided with a first opposing portion that opposes the first plate from the one side in the first direction, and a pair of first joining plate portions that extend toward the other side in the first direction from both ends of the first opposing portion in the second direction, and a second yoke provided with a second opposing portion that opposes the second plate from the other side in the first direction, and a pair of second joining plate portions that extend toward the one side in the first direction from both ends of the second opposing portion in the second direction,
   one of the pair of first joining plate portions and the pair of second joining plate portions is disposed inside the other of the pair of first joining plate portions and the pair of second joining plate portions,
   the connecting body is provided with a pair of first connecting bodies that connect each of a pair of first connecting body fixing portions provided on both ends of the first opposing portion in a third direction and the first plate, the third direction being a direction intersecting the first direction and intersecting the second direction, and
   in the yoke, both sides of the first connecting bodies in the second direction are notched.

2. The actuator according to claim 1, wherein
   the connecting body is provided with a pair of second connecting bodies that connect each of a pair of second connecting body fixing portions provided on both sides of the second opposing portion in the third direction and the second plate, and
   in the yoke, both sides of the second connecting bodies in the second direction are notched.

3. The actuator according to claim 2, wherein
   the coil holder comprises
   a first holder member provided with a first coil holding portion disposed on one side of the coil in the third direction, and a first holder side plate portion that extends in the first direction from an end of the first coil holding portion on one side in the third direction, and
   a second holder member provided with a second coil holding portion disposed on an other side of the coil in the third direction, and a second holder side plate portion that extends in the first direction from an end of the second coil holding portion on an other side in the third direction,
   a width of the first coil holding portion and the second coil holding portion in the second direction is larger than a width of the coil in the second direction, and
   the pair of first connecting bodies and the pair of second connecting bodies overlap the first coil holding portion and the second coil holding portion from one side in the first direction.

4. The actuator according to claim 3, wherein
   the yoke is provided with a pair of connection portions that extend in the first direction on both sides of the coil in the second direction, and connect the first opposing portion and the second opposing portion,
   each of the pair of connection portions is configured by stacking the first joining plate portions and the second joining plate portions,
   the first coil holding portion, when viewed from the second direction, is disposed in a first notch portion in which an edge of each of the pair of connection portions on one side in the third direction has been notched, and
   the second coil holding portion, when viewed from the second direction, is disposed in a second notch portion in which an edge of each of the pair of connection portions on an other side in the third direction has been notched.

5. The actuator according to claim 4, wherein
   the first plate and the second plate are each provided with a central plate portion that is disposed between the pair of connection portions and overlaps the coil, a one side plate portion that extends toward the one side in the third direction from the central plate portion and overlaps the first coil holding portion, and an other side plate portion that extends toward the other side in the third direction from the central plate portion and overlaps the second coil holding portion,
   both ends of the central plate portion in the second direction are provided with a central bent portion that is bent in the first direction and covers a side surface of the coil in the second direction,
   a width of the one side plate portion and the other side plate portion in the second direction is larger than a width of the central plate portion in the second direction,
   one of the pair of first connecting bodies is connected to the one side plate portion of the first plate, and
   the other of the pair of first connecting bodies is connected to the other side plate portion of the first plate.

6. The actuator according to claim 5, wherein
   a length of the first connecting bodies in the second direction is larger than a width of the central plate portion in the second direction.

7. The actuator according to claim 5, wherein
   both ends of the one side plate portion of the first plate in the second direction and both ends of the other side plate portion of the first plate in the second direction are each provided with a fixing bent portion, which are bent toward the other side in the first direction, and are locked to end surfaces on both sides of the first coil holding portion and the second coil holding portion in the second direction.

8. The actuator according to claim 3, wherein
the first holder member is provided with a pair of first holder projection portions that protrude toward the other side in the third direction from edges on both sides of the first holder side plate portion in the second direction,
the second holder member is provided with a pair of second holder projection portions that protrude toward the other side in the third direction from edges on both sides of the second holder side plate portion in the second direction, and
one of the pair of first connecting body fixing portions is disposed between the pair of first holder projection portions, and the other of the pair of first connecting body fixing portions is disposed between the pair of second holder projection portions.

9. The actuator according to claim 8, wherein
the case is provided with a first case member having a first end plate portion that opposes the movable body from the one side in the first direction, and a pair of first case side plate portions extending toward the other side in the first direction from edges on both sides of the first end plate portion in the second direction, and
the first holder projection portions and the second holder projection portions are press-fitted between the pair of first case side plate portions.

10. The actuator according to claim 1, wherein
the first yoke is provided with a plate-shaped first inner member that overlaps the coil from the one side in the first direction, and a first outer member that overlaps the first inner member from the one side in the first direction, and
the second yoke is provided with a plate-shaped second inner member that overlaps the coil from the other side in the first direction, and a second outer member that overlaps the second inner member from the other side in the first direction.

* * * * *